United States Patent
Yamashita et al.

[11] Patent Number: 5,907,428
[45] Date of Patent: May 25, 1999

[54] ACOUSTO-OPTIC ELEMENT LIGHT DEFLECTOR LIGHT BEAM SCANNING APPARATUS AND IMAGE RECORDING APPARATUS

[75] Inventors: Akiko Yamashita; Katsuto Sumi, both of Kanagawa, Japan

[73] Assignee: Fuji Photo Film Co., Ltd., Kanagawa, Japan

[21] Appl. No.: 08/924,308

[22] Filed: Sep. 5, 1997

[30] Foreign Application Priority Data

Sep. 6, 1996 [JP] Japan .................................. 8-236759
Sep. 6, 1996 [JP] Japan .................................. 8-236783

[51] Int. Cl.⁶ .................. G02F 1/11; G02F 1/33
[52] U.S. Cl. .................... 359/285; 359/305; 359/312; 359/314
[58] Field of Search .................... 359/285, 286, 359/287, 305–314

[56] References Cited

FOREIGN PATENT DOCUMENTS 0 701 158  3/1996  European Pat. Off. ........ G02B 26/10
51-99039   9/1976  Japan .

OTHER PUBLICATIONS

"Optical Diffraction by Slow Acoustic Waves in TeO/sub 2/ With an Arbitrary Plane of Incidence"; Proklov V. et al.; Soviet Technical Physics Letters; vol. 5, No. 4, Apr. 1979; pp. 177–178 XP002079516, New York USA.
Patent Abstracts of Japan, vol. 013, No. 409 (P–931), Sep. 11, 1989 & JP 01 149029 A (Matsushita Electric Ind Co., Ltd.) Jun. 12, 1989, Abstract.
Patent Abstracts of Japan, vol. 007, No. 216 (P–225), Sep. 24, 1983 & JP 58 111020 A (Matsushita Denki Sangyo KK), Jul. 1, 1983 *Abstract.

*Primary Examiner*—Georgia Epps
*Assistant Examiner*—Suzanne Letendre
*Attorney, Agent, or Firm*—Sughrue, Mion, Zinn, Macpeak & Seas, PLLC

[57] ABSTRACT

An xyz coordinate system is determined so that a z-axis may coincide with an incident direction of an incident light, an x-axis may coincide with a polarizing direction of the incident light and a y-axis may be defined as the right-handed system from the z-axis and x-axis. An acousto-optic element is rotated around the z-axis, around the axis in a direction of propagation of an ultrasonic wave and around an axis B perpendicular to a plane formed by the z-axis and the direction of propagation of the ultrasonic wave, so that the attitude of the acousto-optic element to the incident light is adjusted.

24 Claims, 25 Drawing Sheets

F I G. 1 9 A
F I G. 1 9 B
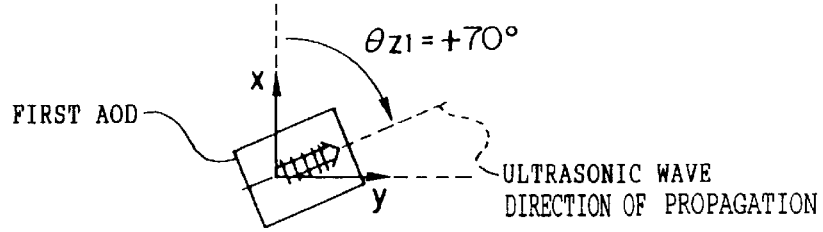
F I G. 1 9 C
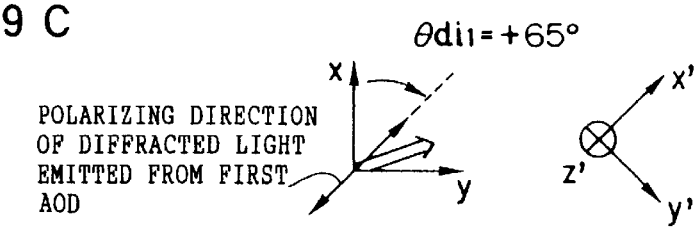
F I G. 1 9 D
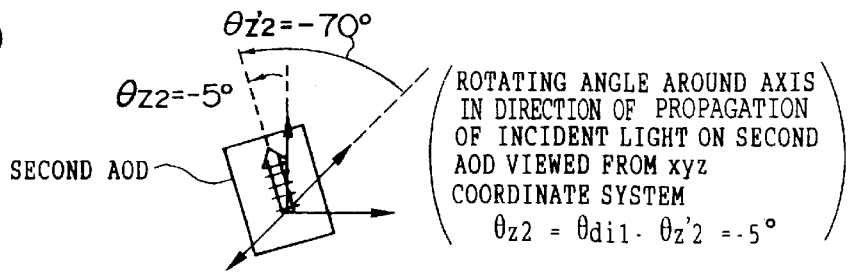
F I G. 1 9 E
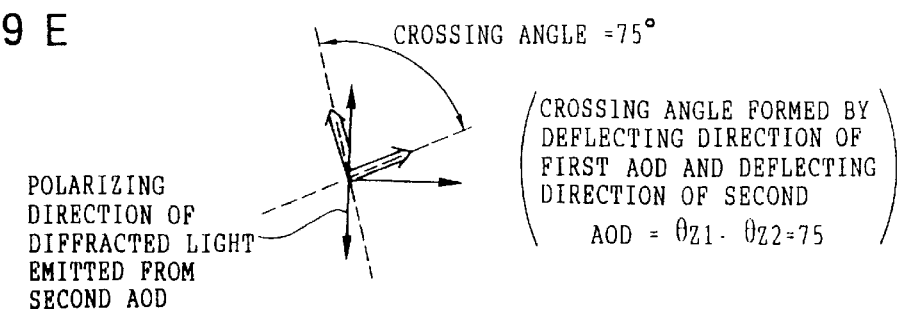

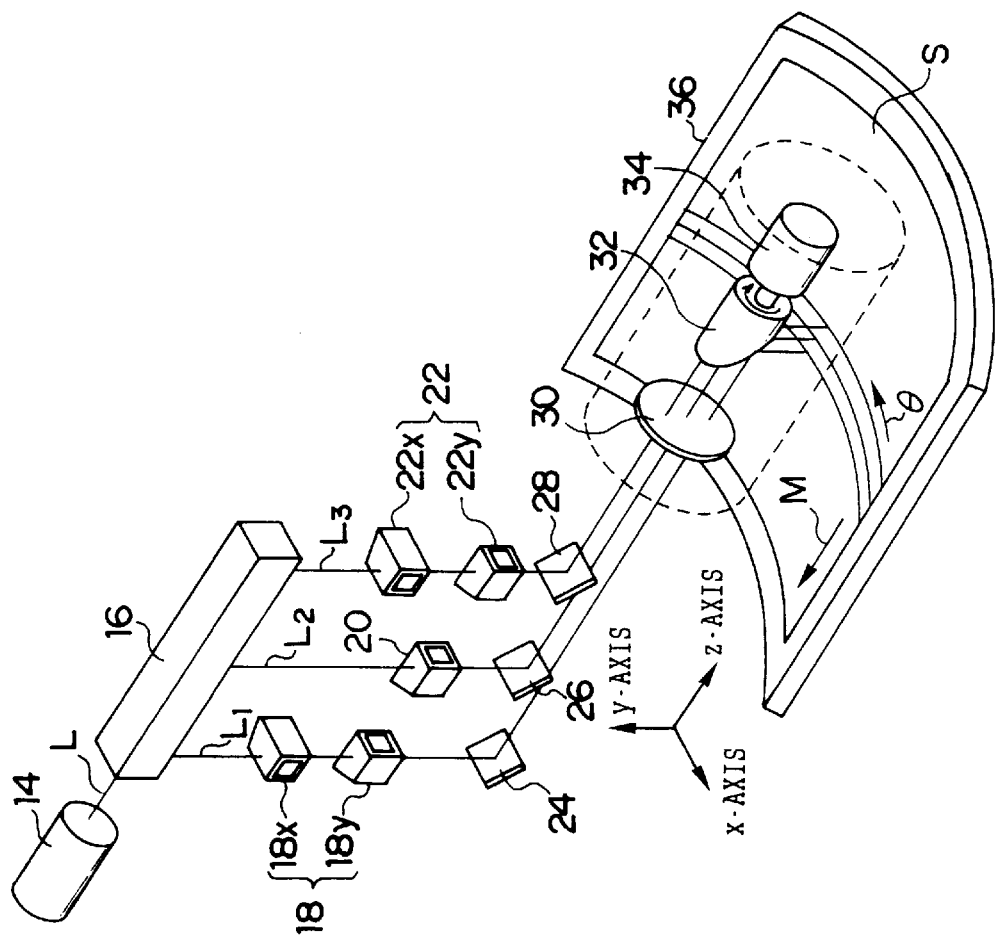

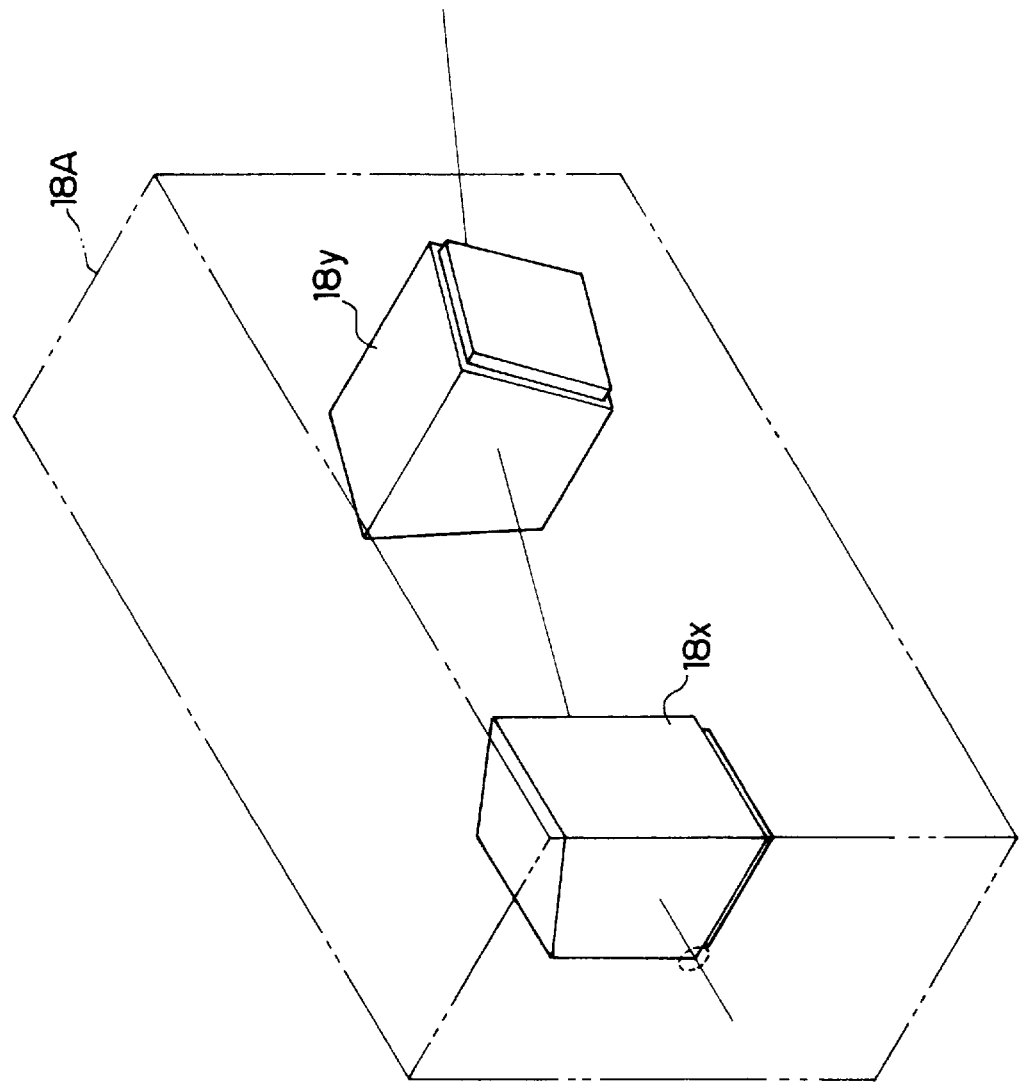

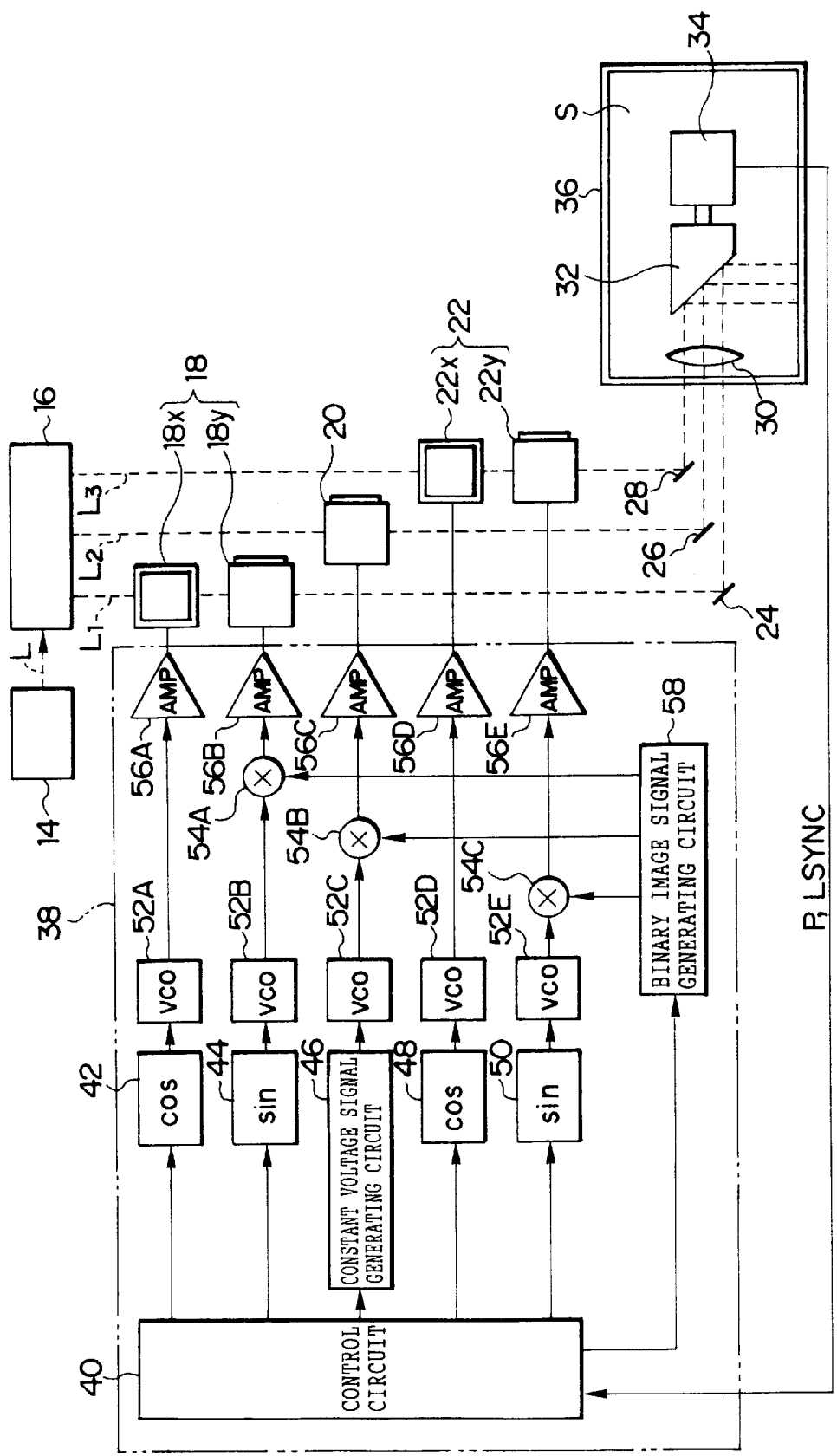

ACOUSTO-OPTIC ELEMENT LIGHT DEFLECTOR LIGHT BEAM SCANNING APPARATUS AND IMAGE RECORDING APPARATUS

BACKGROUND OF THE INVENTION

1. Field of the Invention

The present invention relates to an acousto-optic element, a light deflector, a light beam scanning apparatus and an image recording apparatus. More specifically, the present invention relates to an acousto-optic element such as an acousto-optic modulator (AOM) and an acousto-optic deflector (AOD) using an acousto-optic effect, a light deflector using an acousto-optic effect, a light beam scanning apparatus for use in an image record and an image read by the use of this acousto-optic element and this light deflector, and an image recording apparatus for recording the image by the use of this acousto-optic element and this light deflector.

2. Description of the Related Art

Heretofore, an acousto-optic deflector (referred to as AOD below) for performing a light deflection by an acousto-optic element has been known. This AOD is arranged on an optical path of a light beam of, for example, a light beam scanning apparatus or the like. For example, the light beam to be scanned by the scanning apparatus is previously deflected by the AOD, so that the AOD is used for an application such as a correction of a light beam irradiation position to an irradiated object.

On the other hand, in the above-described AOD, the AOD is provided in which an anisotropic Bragg diffraction generated between an ultrasonic wave propagating in an anisotropic crystal and a light wave propagating in the anisotropic crystal is used so as to perform the light deflection. In such an AOD, a single crystal composed of a tellurium dioxide ($TeO_2$), which is capable of a low-power drive, is used as an acousto-optic medium. A transversal ultrasonic wave, which propagates in a [110] axial direction of a $TeO_2$ crystal and displaces in a [1' 10] axial direction (where 1' denotes a direction of −1), causes the incident light wave in the $TeO_2$ crystal to be diffracted. The AOD using the $TeO_2$ crystal can obtain a higher acousto-optic performance index and a higher diffraction efficiency than the AOD using a lithium niobate or a rock crystal as the acousto-optic medium.

However, the On- [110] type light deflector dose not have flat change characteristics of the diffraction efficiency to a change in a frequency of the ultrasonic wave. Near a center frequency, the diffraction efficiency is considerably reduced, thereby resulting in a considerable reduction of light volume of a diffractive light. Thus, there has been a problem that an available frequency band is narrow. Furthermore, in order to obtain the high diffraction efficiency in the On- [110] type light deflector, the incident light on the light deflector is required to be a circular polarized light. In order to convert a straight polarized laser light emitted from a laser light source into the circular polarized light, a λ/4 plate is necessary. Therefore, there has been another problem that a cost is increased.

As the AOD which solves the above problems, an Off- [110] type light deflector in which a direction of propagation of the ultrasonic wave is largely tilted from the [110] axial direction of the $TeO_2$ crystal (see Japanese Patent Application Laid-open No. 51-99039). According to the Off- [110] type light deflector, the reduction of the light volume near the center frequency that is the problem of the above On-[110] type light deflector is solved. In addition, since the incident laser light may be the straight polarized light, the λ/4 plate is unnecessary.

However, in the Off- [110] type light deflector, since the direction of propagation of the ultrasonic wave is largely tilted from the [110] axial direction, the size of the $TeO_2$ crystal used as the acousto-optic medium is required to be increased. Thus, the cost is increased.

On the other hand, in the light beam scanning apparatus, for the two-dimensional correction (movement) of the light beam irradiation position to the irradiated object or the like, two AODs are combined with each other. The two AODs are arranged so that the AODs may be in series along the optical path of the light beam and the deflecting directions of the light beam of the two AODs are perpendicular to each other (tandem arrangement). However, the problem such as an increase of cost as described above is more significant.

SUMMARY OF THE INVENTION

The present invention is provided so as to solve the above problems. It is a first object of the present invention to provide a low-cost acousto-optic element which can obtain a high diffraction efficiency over a wide frequency band, a light beam scanning apparatus and an image recording apparatus using this acousto-optic element.

It is a second object of the present invention to provide a low-cost light deflector which can two-dimensionally deflect an incident light at the high diffraction efficiency over the wide frequency band, a light beam scanning apparatus and an image recording apparatus using this light deflector.

In order to achieve the first object, according to an aspect of a first invention, there is provided an acousto-optic element being capable of using an anisotropic Bragg diffraction, wherein the acousto-optic element is arranged in such a manner that an optical axis of the anisotropic crystal is not parallel to a plane including a direction of propagation of an incident light and the direction of propagation of an ultrasonic wave.

According to another aspect of the first invention, there is an acousto-optic element capable of using an anisotropic Bragg diffraction, wherein the acousto-optic element is arranged so as to satisfy one of the following conditions, a first condition that the optical axis of the anisotropic crystal is not parallel to the plane including the direction of propagation of the incident light and the direction of propagation of the ultrasonic wave and a plane of polarization of the incident light is parallel to the plane including the direction of propagation of the incident light and the direction of propagation of the ultrasonic wave, and a second condition that the optical axis of the anisotropic crystal is not parallel to the plane including the direction of propagation of the incident light and the direction of propagation of the ultrasonic wave, and the plane of polarization of the incident light is not parallel to the plane including the direction of propagation of the incident light and the direction of propagation of the ultrasonic wave.

The acousto-optic element is arranged so that the optical axis of the anisotropic crystal may not be parallel to the plane including the direction of propagation of the incident light and the direction of propagation of the ultrasonic wave, and the plane of polarization of the incident light may be parallel to the plane including the direction of propagation of the incident light and the direction of propagation of the ultrasonic wave. Thus, the optical axis of the anisotropic crystal is tilted by a predetermined angle in relation to the plane including the direction of propagation of the incident light and the direction of propagation of the ultrasonic wave.

Furthermore, the acousto-optic element is arranged so that the optical axis of the anisotropic crystal may not be parallel to the plane including the direction of propagation of the incident light and the direction of propagation of the ultrasonic wave and the plane of polarization of the incident light may not be parallel to the plane including the direction of propagation of the incident light and the direction of propagation of the ultrasonic wave. Thus, the optical axis of the anisotropic crystal is tilted by a predetermined angle in relation to the plane including the direction of propagation of the incident light and the direction of propagation of the ultrasonic wave. In addition, the plane of polarization of the incident light is tilted by a predetermined angle in relation to the plane including the direction of propagation of the incident light and the direction of propagation of the ultrasonic wave.

The inventor found the following characteristics from experiments and made the present invention. When an attitude of the acousto-optic element is adjusted in the direction which has been not heretofore adjusted except for the Bragg angle, the acousto-optic element is arranged so that the optical axis of the anisotropic crystal may not be parallel to the plane including the direction of propagation of the incident light and the direction of propagation of the ultrasonic wave. At this time, without a considerable inclination of the direction of propagation of the ultrasonic wave from a [110] axial direction of the anisotropic crystal, a diffraction efficiency is higher over a wide frequency.

The acousto-optic element is arranged in the above-described manner, thereby allowing the diffraction efficiency to be increased by the use of a straight polarized light without the increase of the anisotropic crystal.

The acousto-optic element is arranged so that the optical axis of the anisotropic crystal may not be parallel to the plane including the direction of propagation of the incident light and the direction of propagation of the ultrasonic wave. In this case, one of the following conditions is satisfied. A first condition is that the optical axis of the anisotropic crystal is not parallel to the plane including the direction of propagation of the incident light and the direction of propagation of the ultrasonic wave and the plane of polarization of the incident light is parallel to the plane including the direction of propagation of the incident light and the direction of propagation of the ultrasonic wave. A second condition is that the optical axis of the anisotropic crystal is not parallel to the plane including the direction of propagation of the incident light and the direction of propagation of the ultrasonic wave and the plane of polarization of the incident light is not parallel to the plane including the direction of propagation of the incident light and the direction of propagation of the ultrasonic wave.

More concretely, there is provided an acousto-optic element, in which an xyz coordinate system is determined such that the direction of propagation of the incident light is a z-axis and a polarization direction of the incident light is an x-axis, an initial state is defined such that the direction of the ultrasonic wave propagating in the anisotropic crystal is parallel to the x-axis and the optical axis of the anisotropic crystal coincides with the z-axis, and the acousto-optic element is rotated from the initial state by a predetermined angle around an axis perpendicular to the plane including the z-axis and the direction of propagation of the ultrasonic wave, so that the acousto-optic element can use the anisotropic Bragg diffraction generated between the ultrasonic wave propagating in the anisotropic crystal and the light wave propagating in the anisotropic crystal, wherein the acousto-optic element is rotated around the axis in the same direction as the direction of propagation of the ultrasonic wave or around both of the axis in the same direction as the direction of propagation of the ultrasonic wave and the z-axis so as to be arranged.

That is, the initial state is defined in such a manner that the [110] axial direction of the anisotropic crystal is parallel to the x-axis and a [001] axial direction coincides with the z-axis. In this time, from the initial state, the acousto-optic element is rotated around both of the axis in the direction of [110] and the z-axis. In addition, the acousto-optic element is rotated a predetermined angle around the axis perpendicular to the plane including the z-axis and the direction of propagation of the ultrasonic wave.

From the initial state, the angle around the axis perpendicular to the plane including the z-axis and the direction of propagation of the ultrasonic wave is defined as a first predetermined angle. The angle around the axis in the direction of [110] is defined as a second predetermined angle. The angle around the z-axis is defined as a third predetermined angle. When the first and second predetermined angles are adjusted, the first predetermined angle can be defined as the Bragg angle (for example, generally 4°). The second predetermined angle can be generally 3° or more, preferably, generally 9°. These angles are set within this range, thereby allowing the diffraction efficiency to be a preferable value.

When the first, second and third predetermined angles are adjusted together, the first predetermined angle can be defined as the Bragg angle (for example, generally 4°). The second predetermined angle can be generally 3° or more. The third predetermined angle can range from generally 30° to 90°. These angles are set within this range, thereby allowing the diffraction efficiency to be the preferable value. Moreover, the first predetermined angle can be defined as the Bragg angle (for example, generally 4°). The second predetermined angle can range from generally 5° to 10°. The third predetermined angle can range from generally 30° to 90°. Preferably, the first predetermined angle can be defined as the Bragg angle (for example, generally 4°) The second predetermined angle can range from generally 7° to 10°. The third predetermined angle can range from generally 45° to 90°. More preferably, the first predetermined angle can be defined as the Bragg angle (for example, generally 4°) The second predetermined angle can range from generally 9° to 10°. The third predetermined angle can range from generally 70° to 75°. When the first through third predetermined angles are adjusted to the more preferable values, the highest and flattest diffraction efficiency can be obtained over a side frequency band.

Preferably, the acousto-optic element is an acousto-optic deflecting element.

The acousto-optic element is applicable to the light beam scanning apparatus such as the image recording apparatus which scans the light beam so as to record the image or an image reading apparatus which scans the light beam so as to read the image.

That is, there is provided an image recording apparatus which comprises a laser beam generator for generating a plurality of laser beams; a scanning apparatus disposed on an optical path of each laser beam, the scanning apparatus having a plurality of acousto-optic elements of the first invention for changing the direction of the laser beams and a reflecting plane tilted with respect to a central axis of a cylinder, the reflecting plane being rotated around the central axis of the cylinder, thereby scanning the laser beams along an inner plane of the cylinder; an optical system for causing a plurality of laser beams deflected by the acousto-optic elements to be incident on the reflecting plane; and a controller for generating an ultrasonic wave so that the scanning lines of the respective laser beams formed along the inner plane of the cylinder are made parallel to each other and the scanning lengths of the respective laser beams are made equal to each other within the range of the same scanning angle of the scanning apparatus, and for propagating the generated ultrasonic wave in the acousto-optic elements.

Furthermore, in order to achieve the second object, according to a second invention, there is provided a light deflector comprising first and second acousto-optic deflecting element using anisotropic Bragg diffraction generated between an ultrasonic wave propagating in an anisotropic crystal and a light wave propagating in the anisotropic crystal, in which the light deflected by the first acousto-optic deflecting element being incident on the second acousto-optic deflecting element, wherein the first acousto-optic deflecting element is arranged such that the optical axis of an anisotropic crystal of the first acousto-optic deflecting element is not parallel to a plane including a direction of propagation of incident light on the first acousto-optic deflecting element and a direction of propagation of an ultrasonic wave in the anisotropic crystal of the first acousto-optic deflecting element, and the second acousto-optic deflecting element is arranged such that a deflecting direction of the second acousto-optic deflecting element intersects a deflecting direction of the first acousto-optic deflecting element, and the optical axis of an anisotropic crystal of the second acousto-optic deflecting element may not be parallel to the plane including a direction of propagation of incident light which is incident on the second acousto-optic deflecting element and a direction of propagation of an ultrasonic wave in the anisotropic crystal of the second deflecting element.

According to the second invention, the deflecting direction of the second acousto-optic deflecting element crosses the deflecting direction of the first acousto-optic deflecting element, and each deflecting element is arranged as is the case with the first invention. In the second invention, the plane of polarization of the incident light means the plane including the polarizing direction of the incident light, when the incident light is the straight polarized light. The plane of polarization of the incident light means the plane including the polarizing direction of a longitudinal axis of a polarizing component of the incident light, when the incident light is elliptic polarized light.

In an arrangement as described above, each deflecting element is arranged so as to satisfy one of the conditions described above.

In order to arrange the acousto-optic deflecting element as described above, the incident light is fixed, while the attitude of the acousto-optic deflecting element may be adjusted. The acousto-optic deflecting element is fixed, while the direction of propagation of the incident light may be adjusted. Both the attitude of the acousto-optic deflecting element and the direction of propagation of the incident light may be adjusted.

The inventor found the following characteristics from the experiments and made the present invention. In the light deflector wherein the light deflected by the first acousto-optic deflecting element is incident on the second acousto-optic deflecting element and the first and second acousto-optic deflecting elements are arranged so that the deflecting directions on the incident light may cross each other thereby allowing the incident light to be two-dimensionally deflected, each acousto-optic deflecting element is arranged so that the optical axis of the anisotropic crystal of the each acousto-optic deflecting element of each light deflector may not be parallel to the plane including the direction of propagation of the incident light on each acousto-optic deflecting element and the direction of propagation of the ultrasonic wave in the anisotropic crystal in each acousto-optic deflecting element. In this case, the high diffraction efficiency can be obtained over the wide frequency band.

Each deflector of the light deflector is arranged as described above. Without the increase of the size of the anisotropic crystal in the each deflecting element, the light from the straight polarized light is used as the incident light, thereby allowing the diffraction efficiency to be improved more than the conventional diffraction efficiency. It is possible to obtain at a low cost the light deflector which can two-dimensionally deflect the incident light with the high diffraction efficiency over the wide frequency band.

In the above arrangement of each deflecting element of the light deflector, when the incident light is fixed while the attitude of each deflecting element is adjusted, each deflecting element is arranged in the following manner. Concretely, when an xyz coordinate system is determined such that a direction of propagation of incident light which is incident on the first acousto-optic deflecting element is defined as a z-axis and the polarization direction of the incident light is defined as an x-axis, an initial state of the first acousto-optic deflecting element is set to the state that the direction of propagation of the ultrasonic wave in anisotropic crystal of the first acousto-optic deflecting element is parallel to the x-axis and the optical axis of the anisotropic crystal of the first acousto-optic deflecting element coincides with the z-axis, from the initial state, the first acousto-optic deflecting element is rotated around an axis in the same direction as the direction of propagation of the ultrasonic wave and is rotated by a predetermined angle around the axis perpendicular to a plane including the z-axis and the direction of propagation of the ultrasonic wave and the second acousto-optic deflecting element is arranged such that the deflecting direction of the second acousto-optic deflecting element intersects the deflecting direction of the first acousto-optic deflecting element, and when an x'y'z' coordinate system is determined such that a direction of propagation of incident light which is incident on the second acousto-optic deflecting element is defined as a z'-axis and the polarizing direction of the incident is defined as an x'-axis, and an initial state of the second acousto-optic deflecting element is set to the state that the direction of propagation of the ultrasonic wave in an anisotropic crystal of the second acousto-optic deflecting element is parallel to the x'-axis and the optical axis of the anisotropic crystal of the second acousto-optic deflecting element coincides with the z'-axis, from the initial state, the second acousto-optic deflecting element is rotated around an axis in the same direction as the direction of propagation of the ultrasonic wave and is rotated by a predetermined angle around an axis perpendicular to a plane including the z'-axis and the direction of propagation of the ultrasonic wave.

That is, the [110] direction of the anisotropic crystal of the first acousto-optic deflecting element is parallel to the plane of polarization of the incident light, and the [001] direction coincides with the z-axis. This state is defined as the initial state of the first acousto-optic deflecting element. In this case, from the initial state, the first acousto-optic deflecting element is rotated around the axis in the [110] direction and is rotated a predetermined angle around the axis perpendicular to the plane including the z-axis and the direction of propagation of the ultrasonic wave in the anisotropic crystal of the first acousto-optic deflecting element, so that the first acousto-optic deflecting element is arranged. Furthermore, the [110] direction of the anisotropic crystal of the second acousto-optic deflecting element is parallel to the plane of polarization of the incident light, and the [001] direction coincides with the z'-axis. This state is defined as the initial state of the second acousto-optic deflecting element. In this case, the deflecting direction of the first acousto-optic deflecting element crosses that of the second acousto-optic deflecting element. From the initial state, the second acousto-optic deflecting element is rotated around the axis in the [110] direction and is rotated a predetermined angle around the axis perpendicular to the plane including the z'-axis and the direction of propagation of the ultrasonic wave in the anisotropic crystal of the second acousto-optic deflecting element, so that the second acousto-optic deflecting element is arranged.

From the initial state of the first acousto-optic deflecting element, a first predetermined angle of the first acousto-optic deflecting element is the angle around the axis perpendicular to the plane including the z-axis and the direction of propagation of the ultrasonic wave. A second predetermined angle of the first acousto-optic deflecting element is the angle around the axis in the [110] direction. From the initial state of the second acousto-optic deflecting element, a first predetermined angle of the second acousto-optic deflecting element is the angle around the axis perpendicular to the plane including the z'-axis and the direction of propagation of the ultrasonic wave. A second predetermined angle of the second acousto-optic deflecting element is the angle around the axis in the [110] direction. In this case, when each of the first and second predetermined angles of each acousto-optic deflecting element, the first predetermined angle can be defined as the Bragg angle (for example, generally 4°). The second predetermined angle can be generally 3° or more, preferably, generally 9°. These angles are set within this range, thereby allowing the diffraction efficiency to be the preferable value.

In addition, the first acousto-optic deflecting element is further rotated around the z-axis so that the first acousto-optic deflecting element is arranged. The second acousto-optic deflecting element is further rotated around the z'-axis so that the second acousto-optic deflecting element is arranged. This is more effective.

That is, the first acousto-optic deflecting element is rotated, from the initial state of the first acousto-optic deflecting element, a first predetermined angle, a second predetermined angle and a third predetermined angle so that the first acousto-optic deflecting element is arranged. Here, the first predetermined angle is the angle around the axis perpendicular to the plane including the z-axis and the direction of propagation of the ultrasonic wave. The second predetermined angle is the angle around the axis in the [110] direction. The third predetermined angle is the angle around the z-axis. In addition, the second acousto-optic deflecting element is rotated, from the initial state of the second acousto-optic deflecting element, a first predetermined angle, a second predetermined angle and a third predetermined angle so that the first acousto-optic deflecting element is arranged. Here, the first predetermined angle is the angle around the axis perpendicular to the plane including the z'-axis and the direction of propagation of the ultrasonic wave. The second predetermined angle is the angle around the axis in the [110] direction. The third predetermined angle is the angle around the z'-axis.

In each predetermined angle described above, the first predetermined angle can be defined as the Bragg angle (for example, generally 4°). The second predetermined angle can be generally 3° or more. The third predetermined angle can range from generally 30° to 90°. These angles are set within this range, thereby allowing the diffraction efficiency to be the preferable value.

Moreover, when the first through third predetermined angles of each of the first and second acousto-optic deflecting elements are adjusted together, the first predetermined angle can be defined as the Bragg angle (for example, generally 4°) The second predetermined angle can range from generally 3° or more. The third predetermined angle can range from generally 30° to 90°. Preferably, the first predetermined angle can be defined as the Bragg angle (for example, generally 4°). The second predetermined angle can range from generally 7° to 10°. The third predetermined angle can range from generally 45° to 90°. More preferably, the first predetermined angle can be defined as the Bragg angle (for example, generally 4°). The second predetermined angle can range from generally 9° to 10°. The third predetermined angle can range from generally 70° to 90°. Still more preferably, the third predetermined angle can range from generally 70° to 75°. When the first through third predetermined angles are adjusted to the more preferable values, the highest and flattest diffraction efficiency can be obtained over a side frequency band.

Furthermore, preferably, the deflecting directions of the first and second acousto-optic deflecting elements are perpendicular to each other.

Furthermore, in the first and second inventions, although a uniaxial crystal and a biaxial crystal can be used as the acousto-optic crystal, preferably, the uniaxial crystal is used. More preferably, a $TeO_2$ is used as the acousto-optic crystal.

Each of the first and second acousto-optic deflecting elements is mounted in a single package, so that the light deflector according to the present invention is constructed. In this case, when the light deflector is mounted to the light beam scanning apparatus or the like, the attitude of the single package is adjusted, thereby allowing the attitude adjustment of each deflecting element to be completed. Accordingly, this is preferable.

The above light deflector is applicable to the light beam scanning apparatus such as the image recording apparatus which scans the light beam so as to record the image or the image reading apparatus which scans the light beam so as to read the image.

That is, there is provided an image recording apparatus which comprises a laser beam generator for generating a plurality of laser beams which are made parallel in a predetermined direction; a scanning apparatus disposed on an optical path of each laser beam, the scanning apparatus having a plurality of acousto-optic elements of the second invention for changing the directions of the laser beams to a directions perpendicular to the parallel direction of the laser beams and a reflecting plane tilted with respect to a central axis of a cylinder, the scanning apparatus being rotated around the central axis of the cylinder, thereby scanning the laser beams along an inner plane of the cylinder; an optical system for causing a plurality of laser beams deflected by the acousto-optic element to be incident on the reflecting plane; and a controller for generating an ultrasonic wave so that the scanning lines of each laser beam formed along the inner plane of the cylinder are made parallel to each other and the scanning lengths of the respective laser beams are made equal to each other within the range of the same scanning angle of the scanning apparatus, and for propagating the generated ultrasonic wave in the acousto-optic elements.

BRIEF DESCRIPTION OF THE DRAWINGS

FIG. 19A is a conceptual view showing the polarizing direction of the incident light on the first AOD for illustrating other conditions for obtaining the high diffraction efficiency in the light deflector.

FIG. 19B is a conceptual view showing the attitude of the first AOD for illustrating the above-described other conditions.

FIG. 19C is a conceptual view showing the polarizing direction of the diffracted light emitted from the first AOD for illustrating the above-described other conditions.

FIG. 19D is a conceptual view showing the attitude of the second AOD for illustrating the above-described other conditions.

FIG. 19E is a conceptual view showing the polarizing direction of the diffracted light emitted from the second AOD for illustrating the above-described other conditions.

FIG. 20 is a perspective view showing a schematic construction of the image recording apparatus according to the embodiment.

FIG. 21 is a perspective view showing the state that the first and second AODs constituting the light deflector are mounted in the same package.

FIG. 25 is a schematic block diagram of the controller of the image recording apparatus according to the embodiment.

DETAILED DESCRIPTION OF THE PREFERRED EMBODIMENTS

Figure 1:
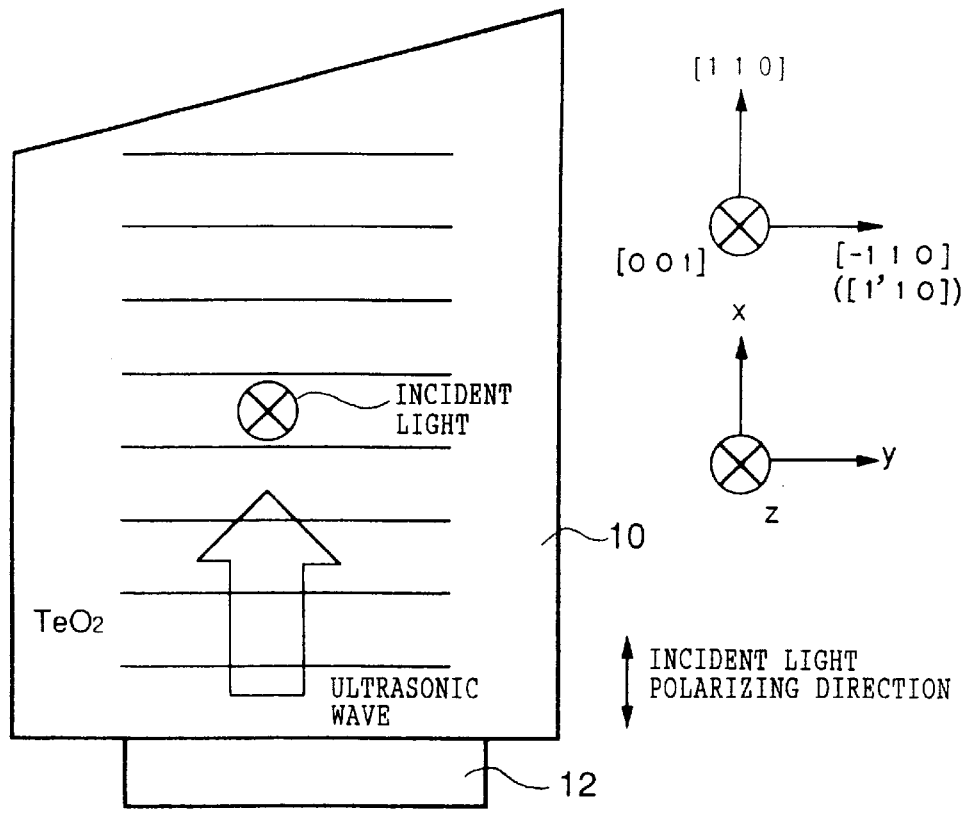
FIG. 1 is a schematic diagram of an AOD according to an embodiment of the present invention.

Hereinafter, a first embodiment of the present invention will be described in detail with reference to the accompanying drawings. In the first place, a case is described in which the present invention is applied to an On- [110] type light deflector (AOD) using a $TeO_2$ single crystal. As shown in FIG. 1, the AOD comprises a $TeO_2$ single crystal 10 whose head is obliquely cut and a transducer 12 which generates a transversal ultrasonic wave that is propagated in a [110] direction of the crystal and is displaced in a [1' 10] direction, and which is affixed on a bottom plane of the $TeO_2$ single crystal 10. On the head of the $TeO_2$ single crystal 10, an sound-absorbent material (not shown) may be affixed.

Figure 2:
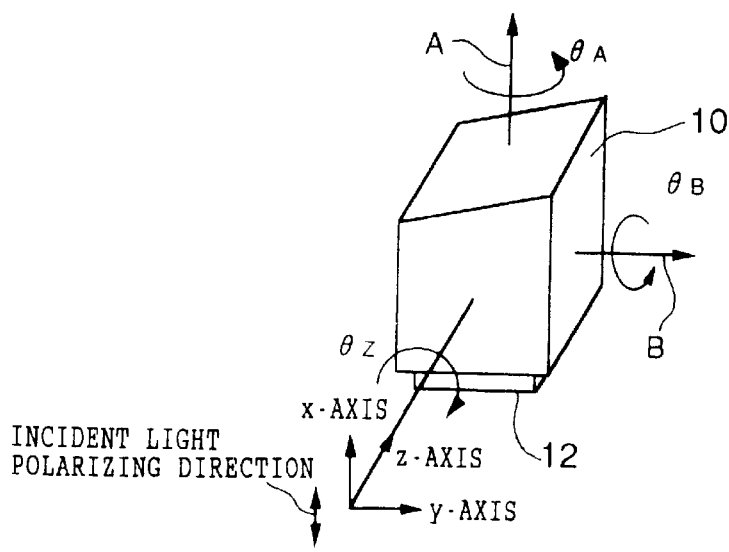
FIG. 2 is a perspective view of the AOD for illustrating an axis which rotates the AOD according to the embodiment of the present invention.

Furthermore, as shown in FIGS. 1 and 2, an xyz coordinate system is defined in which a z-axis coincides with a direction of propagation of an incident light, an x-axis coincides with a polarizing direction of the incident light and a y-axis is defined as a right-handed system from the z-axis and x-axis.

Moreover, as shown in FIG. 1, a state that the direction of propagation of the ultrasonic wave propagating in the $TeO_2$ single crystal 10, that is, the [110] direction of the crystal is parallel to the x-axis and an optical axis, namely, a [001] direction coincides with the direction of z-axis is defined as an initial state. Three rotating angles around the axes for adjusting an attitude of the AOD from the initial state, that is, a Bragg angle $\theta_B$, an warping angle $\theta_A$ and a rotating angle $\theta_Z$ around the axis in the direction of propagation of the incident light are determined as described below as shown in FIG. 2, respectively.

The Bragg angle $\theta_B$ represents a rotation of the AOD on a plane including the direction of propagation of the incident light (z-axis) and the direction of propagation of the ultrasonic wave. That is, the Bragg angle $\theta_B$ represents the rotation around an axis B which is perpendicular to the plane formed by the z-axis and the direction of propagation of the ultrasonic wave. When the Bragg angle $\theta_B$ is rotated from a plus direction side of the z-axis to the plus direction of the direction of propagation of the ultrasonic wave, that is, when it is rotated in a right-handed screw toward the plus direction of the axis B, the Bragg angle $\theta_B$ is defined as a plus. When the direction of propagation of the ultrasonic wave is perpendicular to the z-axis, the Bragg angle $\theta_B$ is defined as $\theta_B=0$.

The warping angle $\theta_A$ represents the rotation around the direction of propagation of the ultrasonic wave, that is, the rotation around an axis A in the [110] direction. When the warping angle $\theta_A$ is rotated in the right-handed screw toward the direction of propagation of the ultrasonic wave, the warping angle $\theta_A$ is defined as the plus. When the optical axis [001] of the crystal is parallel to the plane including a plane containing the direction of propagation of the incident light and the direction of propagation of the ultrasonic wave, the warping angle $\theta_A$ is defined as $\theta_A=0$.

The rotating angle $\theta_Z$ around the axis in the direction of propagation of the incident light represents the rotation around the z-axis. When the rotating angle $\theta_Z$ is rotated in the right-handed screw toward the plus direction in the direction of z-axis, the rotating angle $\theta_Z$ is defined as the plus. When the direction of propagation of the ultrasonic wave is parallel to the x-axis (when a polarized plane of the incident light is parallel to the plane including the direction of propagation of the incident light and the direction of propagation of the ultrasonic wave), the rotating angle $\theta_Z$ is defined as $\theta_Z=0$.

Figure 3:
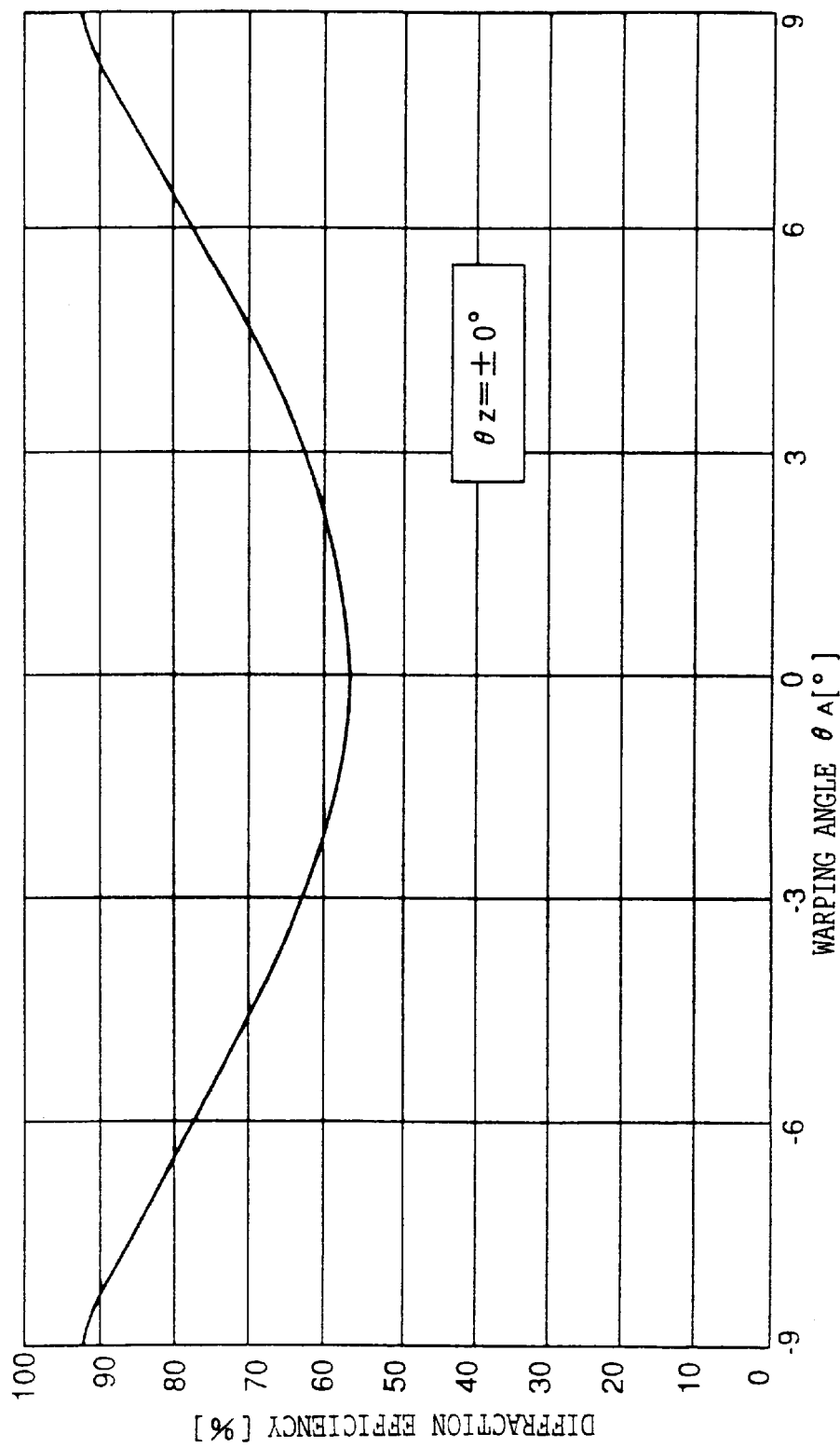
FIG. 3 is a graph showing a change in a diffraction efficiency to the change in warping angle $\theta_A$ alone according to the embodiment of the present invention.
Figure 4:
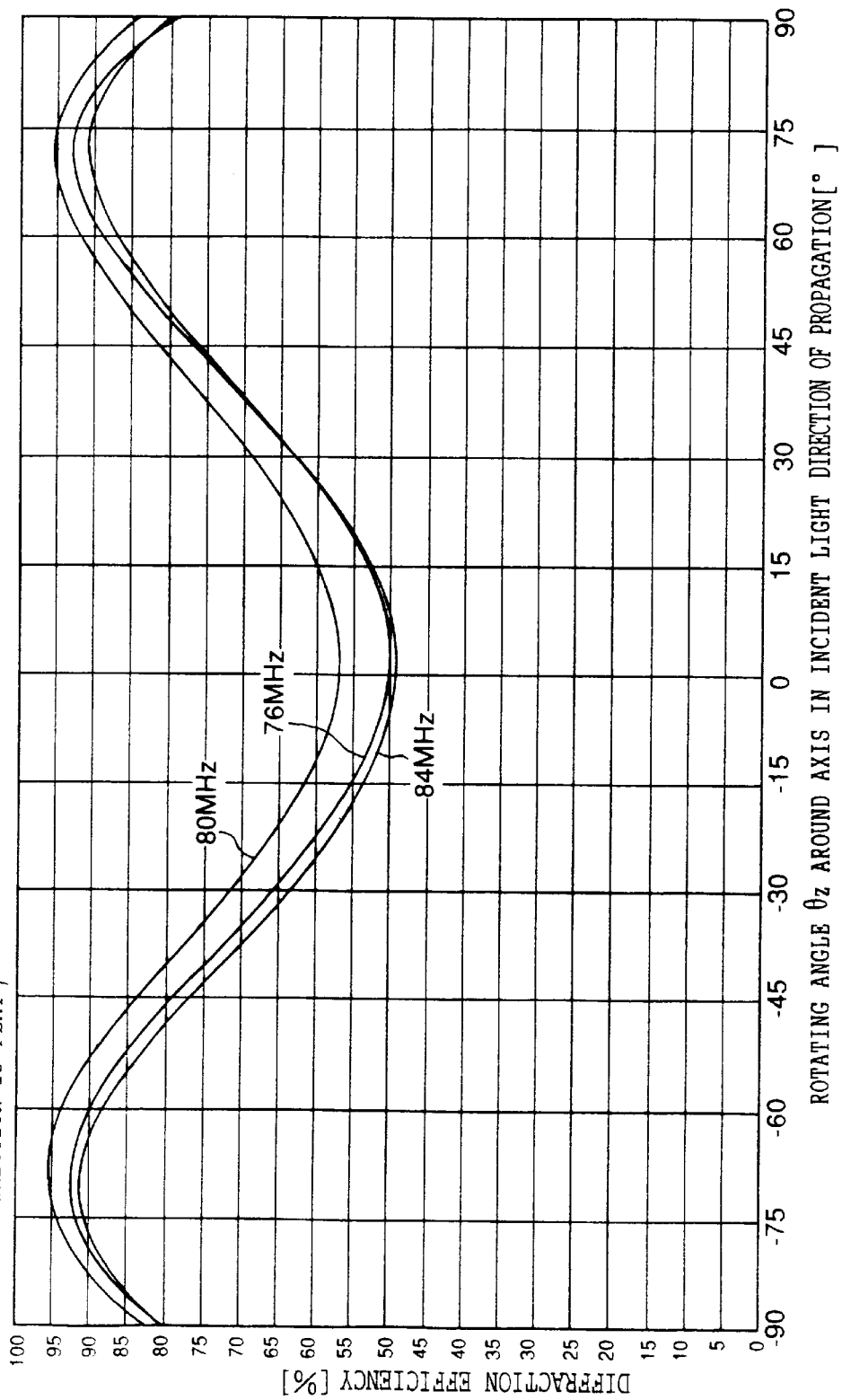
FIG. 4 is a graph showing the change in the diffraction efficiency to the change in a rotating angle $\theta_Z$ around an axis in a direction of propagation of an incident light according to the embodiment of the present invention (when a shape of frequency characteristics of the diffraction efficiency is flat).
Figure 5:
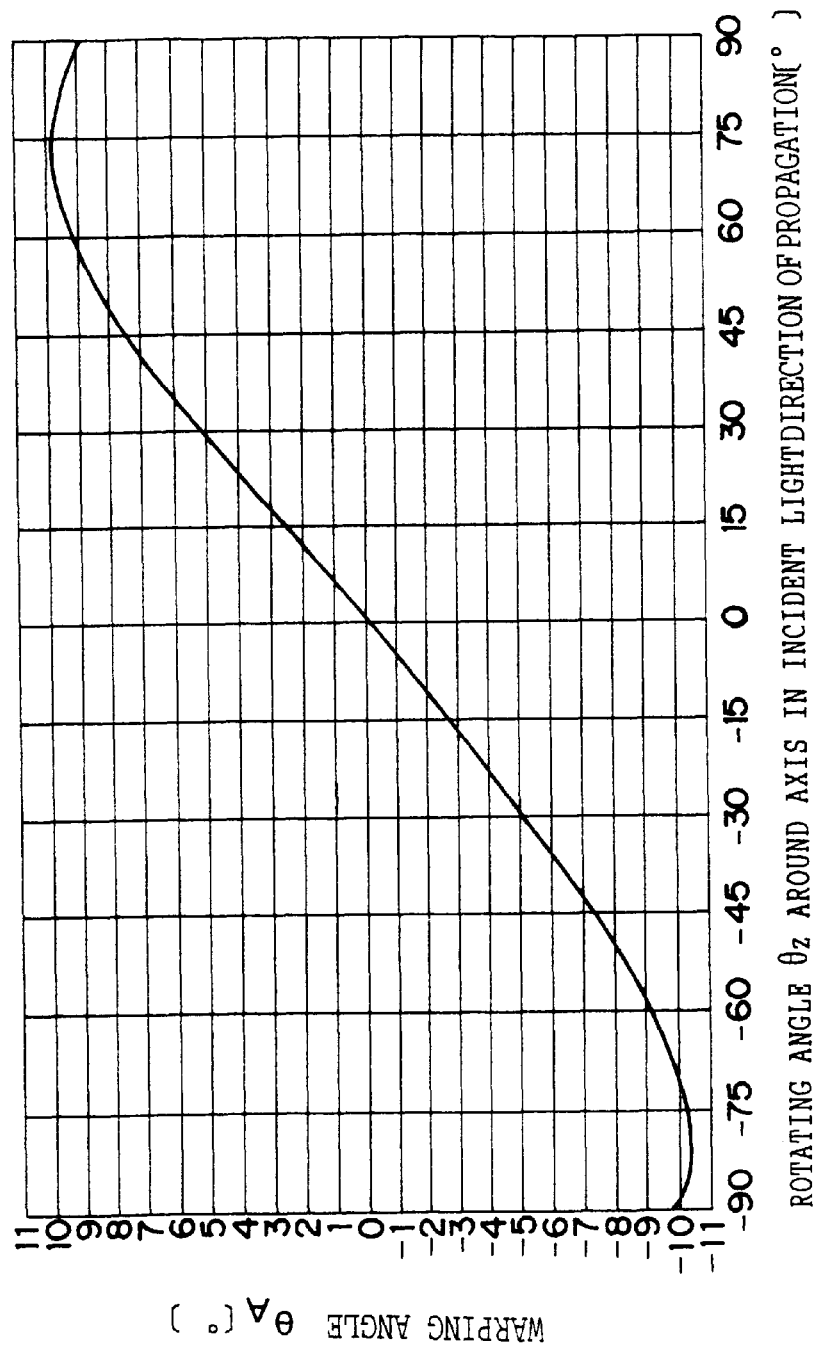
FIG. 5 is a graph showing a relationship between the rotating angle $\theta_Z$ around the axis in the direction of propagation of the incident light and the warping angle $\theta_A$ for obtaining the diffraction efficiency of FIG. 4.

A high frequency signal having 0.25 W of power is applied to the transducer 12. The ultrasonic wave is propagated. A laser beam whose polarizing direction extends in the direction of x-axis is incident from the direction of z-axis. The warping angle $\theta_A$ is changed. The Bragg angle $\theta_B$ is adjusted so that it may satisfy Bragg conditions. In this case, diffraction efficiency characteristics are shown in FIG. 3. On the other hand, the rotating angle $\theta_Z$ around the axis in the direction of propagation of the incident light is changed. The warping angle $\theta_A$ is adjusted so that, in the rotating angle $\theta_Z$ around the axis in the direction of propagation of incident light, the diffraction efficiency may be maximized. The Bragg angle $\theta_B$ is adjusted so that it may satisfy the Bragg conditions. In this case, the diffraction efficiency characteristics in center frequencies 76 MHz, 80 MHz and 84 MHz are shown in FIG. 4. In addition, FIG. 5 shows a relationship between the rotating angle $\theta_Z$ around the axis in the direction of propagation of the incident light and the warping angle $\theta_A$ at this time.

Figure 6:
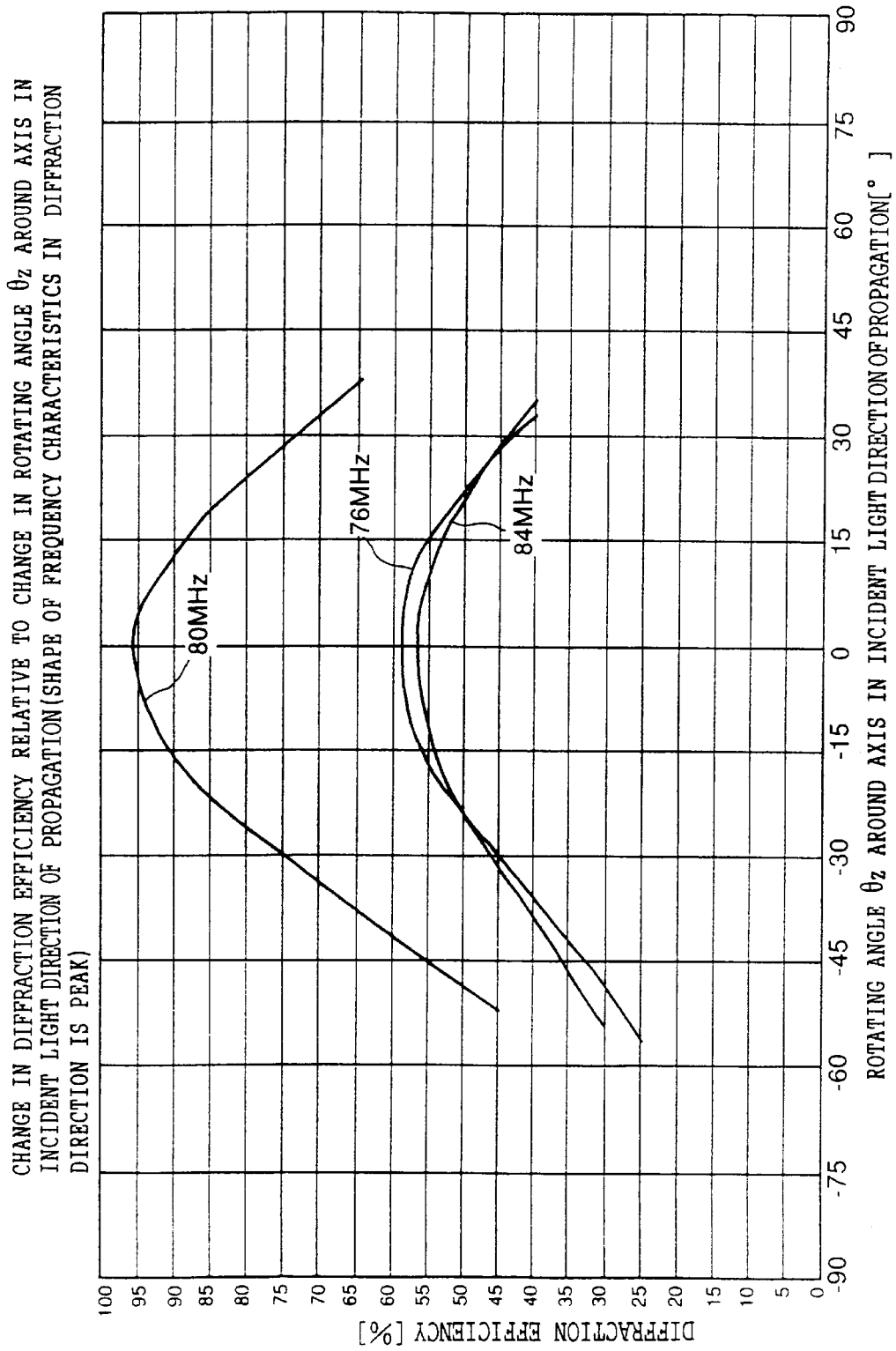
FIG. 6 is a graph showing the change in the diffraction efficiency to the change in the rotating angle $\theta_Z$ around the axis in the direction of propagation of the incident light (when the frequency characteristics of the diffraction efficiency is peak-shaped).

When the warping angle $\theta_A$ is adjusted to the same rotating angle $\theta_Z$, two characteristics are obtained, which is confirmed by the inventor or the like. FIG. 4 shows the case that a shape of frequency characteristics of the diffraction efficiency is flat (the diffraction efficiency is generally constant regardless of the frequency). FIG. 6 shows the case that the frequency characteristics of the diffraction efficiency is peak-shaped (the diffraction efficiency is high at the center frequency and is low at a periphery) for reference.

As understood from FIG. 3, compared to the diffraction efficiency (about 58% at 80 MHz) during a conventional adjustment ($\theta_B \doteq 4°$, $\theta_Z = \theta_A = 0°$) of the Bragg angle $\theta_B$ alone, both of the Bragg angle $\theta_B$ and the warping angle $\theta_A$ are adjusted, thereby resulting in an improvement of the diffraction efficiency. More specifically, a diffraction efficiency $\eta$ is $\eta \doteq 95\%$ at $\theta_A \doteq \pm 9°$. Furthermore, at $\theta_A \doteq \pm 6°$ to $\pm 9°$, the diffraction efficiency $\eta$ is $\eta \doteq 80$–$95\%$. At $\theta_{A \doteq \pm} 4°$ to $\pm 9°$, the diffraction efficiency $\eta$ is $\eta \doteq 70$–$95\%$. In order that the diffraction efficiency $\eta$ may be about 10% higher than the conventional diffraction efficiency, the warping angle $\theta_A$ can only be generally 3° or more.

In addition, as understood from FIG. 4, compared to the diffraction efficiency during the conventional adjustment, the Bragg angle $\theta_B$ is adjusted and the rotating angle $\theta_Z$ around the axis in the direction of propagation of the incident light and the warping angle $\theta_A$ are also adjusted in either plus or minus direction, resulting in the improvement of the diffraction efficiency. More specifically, the diffraction efficiency $\eta$ is $\eta \doteq 95\%$ at $\theta_Z \doteq \pm(70°$ to $75°)$ and $\theta_A \doteq \pm(9°$ to $10°)$. Furthermore, at $\theta_Z \doteq \pm(45°$ to $90°)$ and $\theta_A \doteq \pm(7°$ to $10°)$, the diffraction efficiency $\eta$ is $\eta \doteq 80$–$95\%$. At $\theta_Z \doteq \pm(30°$ to $90°)$ and $\theta_A \doteq \pm(5°$ to $10°)$, the diffraction efficiency $\eta$ is $\eta \doteq 70$–$95\%$.

Although the case that the Bragg angle $\theta_B$ is plus is described above, the case that the Bragg angle $\theta_B$ is minus ($\theta_B \doteq -4°$) is the same. Table 1 shows the case that the diffraction efficiency $\eta$ is at the peak (about 95%).

TABLE 1

| $\theta_B$ | $\theta_Z$ | $\theta_A$ | diffraction efficiency $\eta$ (%) |
|---|---|---|---|
| ≈+4° | ≈+(70 to 75) | ≈+(9 to 10) | ≈95 |
| ≈+4° | ≈−(70 to 75) | ≈+(9 to 10) | ≈95 |
| ≈+4° | ≈+(70 to 75) | ≈−(9 to 10) | ≈95 |
| ≈+4° | ≈−(70 to 75) | ≈−(9 to 10) | ≈95 |

Figure 7:
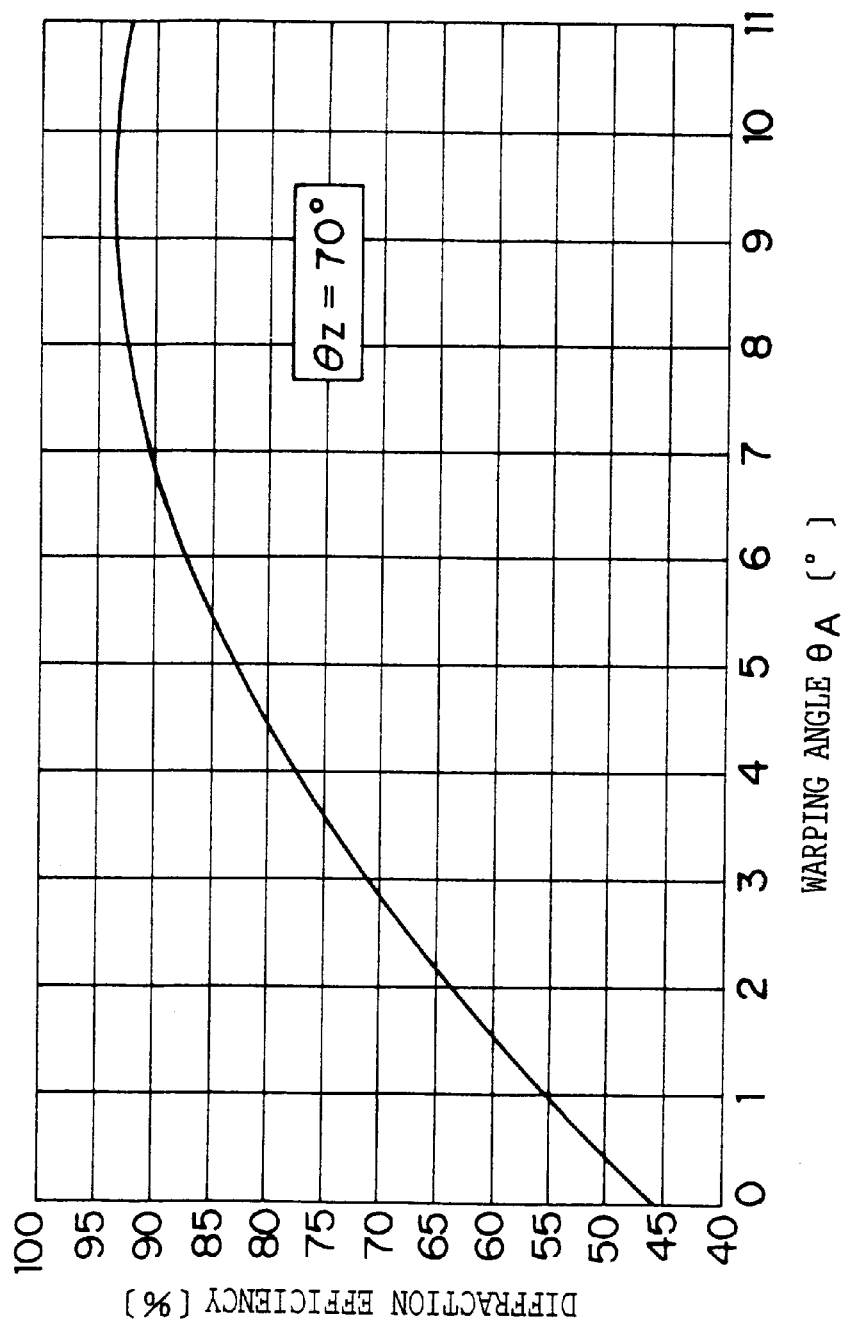
FIG. 7 is a graph showing the change in the diffraction efficiency to the change in the warping angle $\theta_A$ when the rotating angle $\theta_Z$ around the axis in the direction of propagation of the incident light is 70°.

FIG. 7 shows the diffraction efficiency characteristics when the rotating angle $\theta_Z$ around the axis in the direction of propagation of the incident light is fixed to the angle at which the diffraction efficiency obtained from FIG. 4 becomes peak, for example, to $\theta_Z=70°$ so that the warping angle $\theta_A$ is changed.

As understood from FIG. 7, even if the rotating angle $\theta_Z$ around the axis in the direction of propagation of the incident light is fixed and the warping angle $\theta_A$ alone is changed, the warping angle $\theta_A$ is adjusted to, for example, $\theta_A \doteq 1.5°$ or more, thereby allowing the diffraction efficiency to be improved more than the conventional diffraction efficiency. The diffraction efficiency is generally 95% at $\theta_A \doteq 9°$, generally 80–95% at $\theta_A \doteq 4.5°$ or more and generally 70–95% at $\theta_A \doteq 3°$ or more.

Accordingly, when the rotating angle $\theta_Z$ around the axis in the direction of propagation of the incident light and the warping angle $\theta_A$ are adjusted, the rotating angle $\theta_Z$ around the axis in the direction of propagation of the incident light is fixed and the warping angle $\theta_A$ is changed from the angle that the maximum diffraction efficiency is obtained. In this case, when the warping angle $\theta_A$ is defined as generally 1.5° or more, the diffraction efficiency can be improved more than the conventional diffraction efficiency. When the warping angle $\theta_A$ is defined as generally 3° or more, the diffraction efficiency of generally 70–95% can be obtained. When the warping angle $\theta_A$ is defined as generally 4.5° or more, the diffraction efficiency of generally 80–95% can be obtained.

Figure 8:
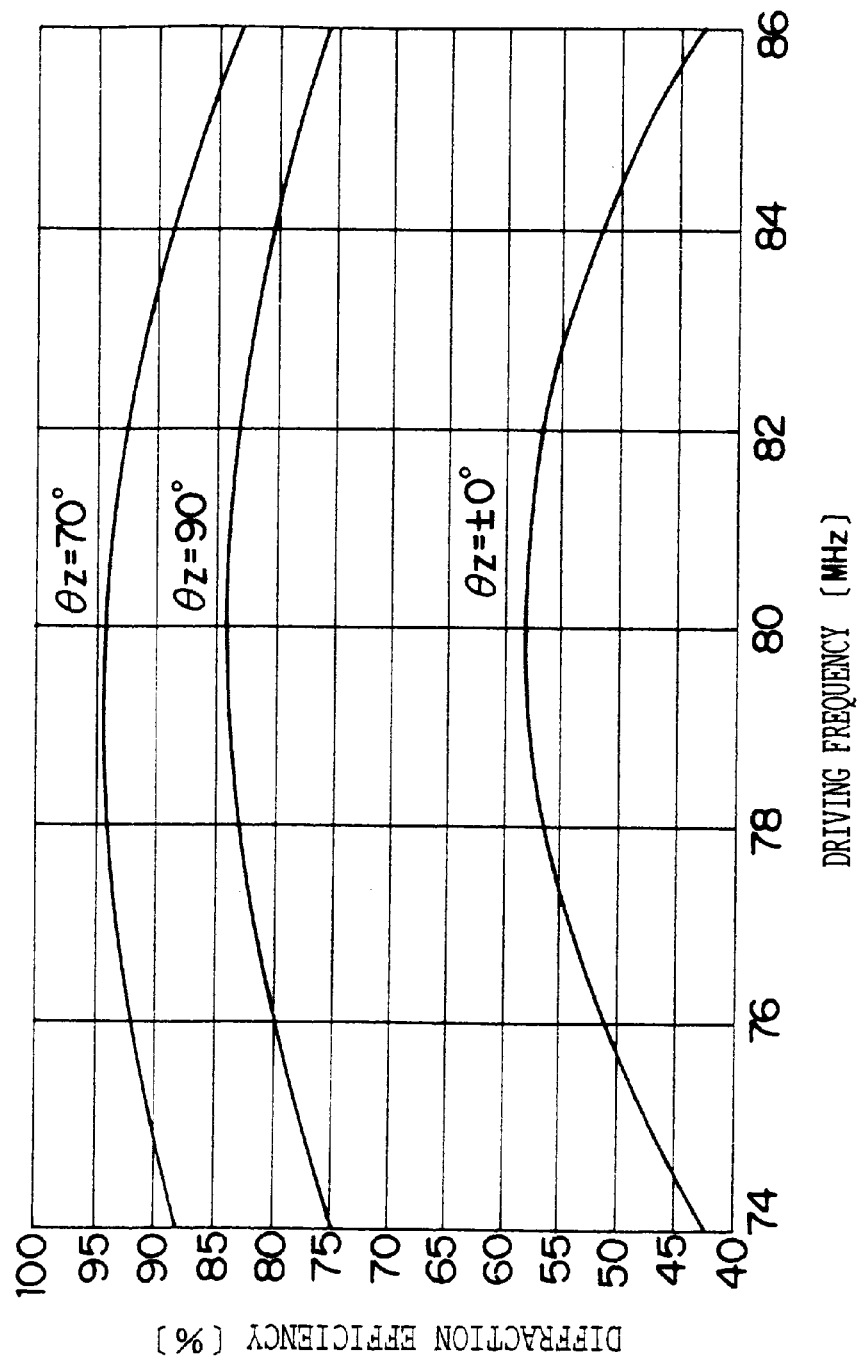
FIG. 8 is a graph showing the diffraction efficiency in a certain frequency band according to the embodiment of the present invention.

Although the result in the center frequency is described above, the diffraction efficiency is also improved more than the conventional diffraction efficiency in a predetermined frequency band. FIG. 8 shows one of the conditions for the peak of the diffraction efficiency of Table 1, that is, the frequency characteristics of the diffraction efficiency at $\theta_Z=70°$ and $\theta_A=9°$, the frequency characteristics of the diffraction efficiency when the rotating angle $\theta_Z$ around the axis in the direction of propagation of the incident light is defined as 90° ($\theta_A=9°$) and the frequency characteristics of the conventional diffraction efficiency ($\theta_Z=\theta_A=\pm 0°$). According to the embodiment, the diffraction efficiency in a predetermined frequency band is improved more than the conventional diffraction efficiency.

In such a manner, the arrangement is accomplished so that an anisotropic Bragg diffraction can be used. In addition, the arrangement is accomplished so that the optical axis of an anisotropic crystal may not be parallel to the plane including the direction of propagation of the incident light and the direction of propagation of the ultrasonic wave. Thus, the diffraction efficiency can be improved.

That is, the arrangement is accomplished so that the anisotropic Bragg diffraction can be used. In addition, the optical axis of the anisotropic crystal is not parallel to the plane including the direction of propagation of the incident light and the direction of propagation of the ultrasonic wave, and the polarized plane of the incident light is parallel to the plane including the direction of propagation of the incident light and the direction of propagation of the ultrasonic wave. Otherwise, the optical axis of the anisotropic crystal is not parallel to the plane including the direction of propagation of the incident light and the direction of propagation of the ultrasonic wave, and the polarized plane of the incident light is not parallel to the plane including the direction of propagation of the incident light and the direction of propagation of the ultrasonic wave. Thus, the diffraction efficiency can be improved.

Although an example is described above in which the $TeO_2$ single crystal is used as the acousto-optic medium, a uniaxial crystal and a biaxial crystal of $PbMoO_4$ or the like can be used in the present invention. Furthermore, although the AOD is described above, the present invention is also applicable to an AOM.

Next, an embodiment of a cylindrical inner plane scanning type image recording apparatus in which the above-described AOD is used for a light beam scanning apparatus will be described with reference to the accompanying drawings. The cylindrical inner plane scanning type image recording apparatus comprises laser beam generating means for generating a plurality of laser beams which are parallel in a predetermined direction, a plurality of deflectors which are disposed in an optical path of each laser beam and deflect the laser beams in a perpendicular direction against the parallel direction of the laser beams, scanning means which is provided with a reflecting surface tilted in relation to a central axis of a cylinder and is rotated around the central axis of the cylinder so as to scan the laser beams along the inner plane of the cylinder, and an optical system which causes a plurality of laser beams deflected by the deflector to be incident on the reflecting plane of the scanning means.

Figure 9:
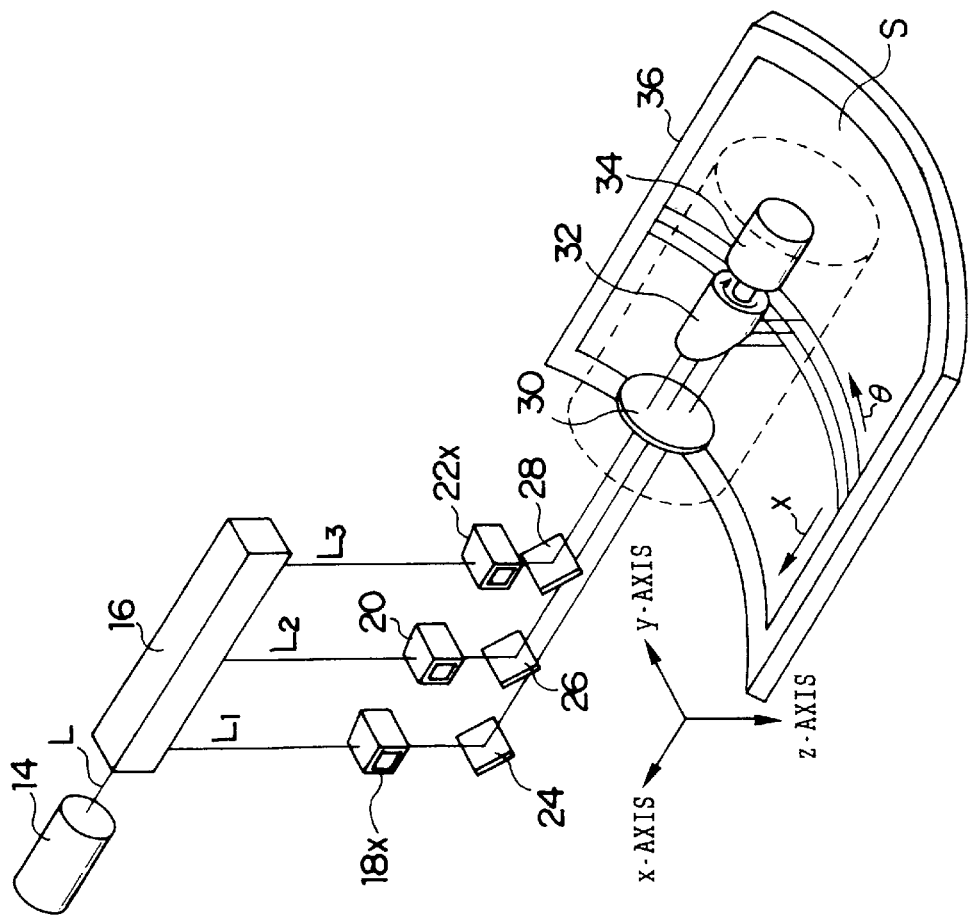
FIG. 9 is a schematic diagram of an image recording apparatus according to the embodiment of the present invention.

As shown in FIG. 9, the image recording apparatus according to the embodiment comprises a laser beam generator 14 which generates a laser beam L and a laser beam splitter 16 which splits the laser beam generated from the laser beam generator 14 into three laser beams $L_1$, $L_2$ and $L_3$ paralleled in a predetermined direction. On the side that the laser beam $L_1$ is emitted, an AOD 18x is disposed. The AOD 18x deflects the laser beam $L_1$ in a direction perpendicular to the parallel direction of the laser beam, that is, in a direction of y-axis in FIG. 9 (a direction perpendicular to the parallel direction of the laser beam on a recording sheet S) and strength-modulates (On/Off modulates) the laser beam in response to image information. On the side that the laser beam $L_2$ is emitted, an AOD 20 is disposed. The AOD 20 On/Off modulates the laser beam in response to the image information without deflecting the laser beam $L_2$. On the side that the laser beam $L_3$ is emitted, an AOD 22x is disposed. The AOD 22x deflects the laser beam $L_3$ in the direction of y-axis and On/Off modulates the laser beam in response to the image information, similarly to the AOD 18x.

As described above, the AODs 18x, 20 and 22x are arranged so that the optical axis of the anisotropic crystal may not be parallel to the plane including the direction of propagation of the incident light and the direction of propagation of the ultrasonic wave. In the embodiment, although, preferably, the adjustment is performed to $\theta_B \doteq 4°$, $\theta_Z \doteq 70°$ and $\theta_A \doteq 9°$, $\theta_Z$ may be defined as $\theta_Z \doteq 0°$ so as to adjust $\theta_B$ and $\theta_A$.

On the side that the laser beams are emitted from the AODs 18x, 20 and 22x, mirrors 24, 26 and 28 are disposed.

The mirrors 24, 26 and 28 reflect each laser beam in a minus direction of x-axis. On the side that the laser beams are reflected from the mirrors, a focusing lens 30 and a cylindrical rotating mirror 32 are disposed. The focusing lens 30 focuses the laser beams which are reflected from the mirrors. The rotating mirror 32 is provided with the reflecting plane inclining 45° in relation to the axis and is rotated around the axis by a motor 34. The recording sheet S is held on an inner circumferential plane of a cylindrical drum 36 shown by an exploded view. The rotating mirror 32 is disposed so that the axis thereof may coincide with the central axis of the drum 36.

Figure 13A:
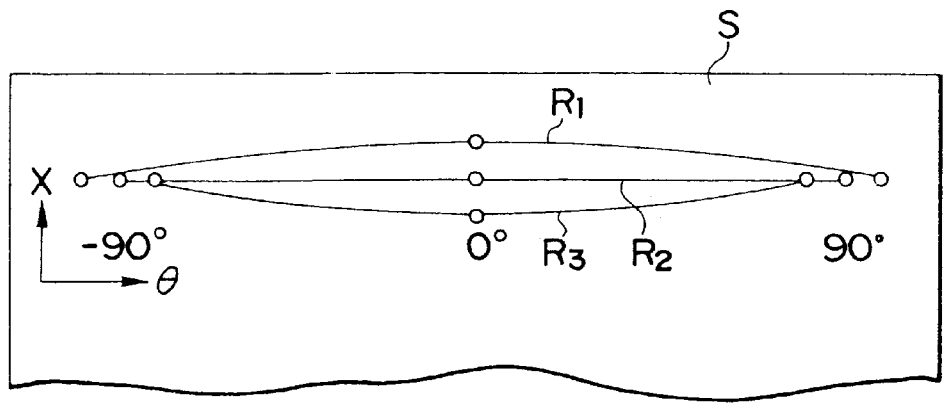
FIG. 13A shows a scanning line when a rotation of an image by a rotating mirror is not corrected.

In the image recording apparatus, dots are recorded by the laser beam, and the dots are then arranged on the recording sheet S in the direction of x-axis. From this state (the state shown in FIG. 9), when the rotating mirror 32 is rotated by 90°, the rotation of the rotating mirror 32 causes a dot arrangement to be rotated by 90° as shown in FIG. 13A. That is, the dot arrangement is rotated with the rotation of the rotating mirror 32. The dots are recorded by the laser beams $L_1$ and $L_3$ which are not incident on the center of the reflecting plane of the rotating mirror 32. The dots are simple harmonic motion. The loci $R_1$ and $R_3$ recorded by the laser beams $L_1$ and $L_3$ are sine-wave shaped. In this case, the locus of the dots recorded by the laser beam $L_1$ is phase-shifted 180° from the locus of the dots recorded by the laser beam $L_3$. Since the laser beam $L_2$ is incident on the center of the reflecting plane of the rotating mirror 32, the dots recorded by the laser beam $L_2$ are not simple harmonic motion. Thus, a locus $R_2$ of the dots recorded by the laser beam $L_2$ become a straight line. In the embodiment, in order that the rotation of the dot arrangement is corrected so that each scanning line may be parallel to each other, a controller shown in FIG. 10 is disposed.

Figure 10:
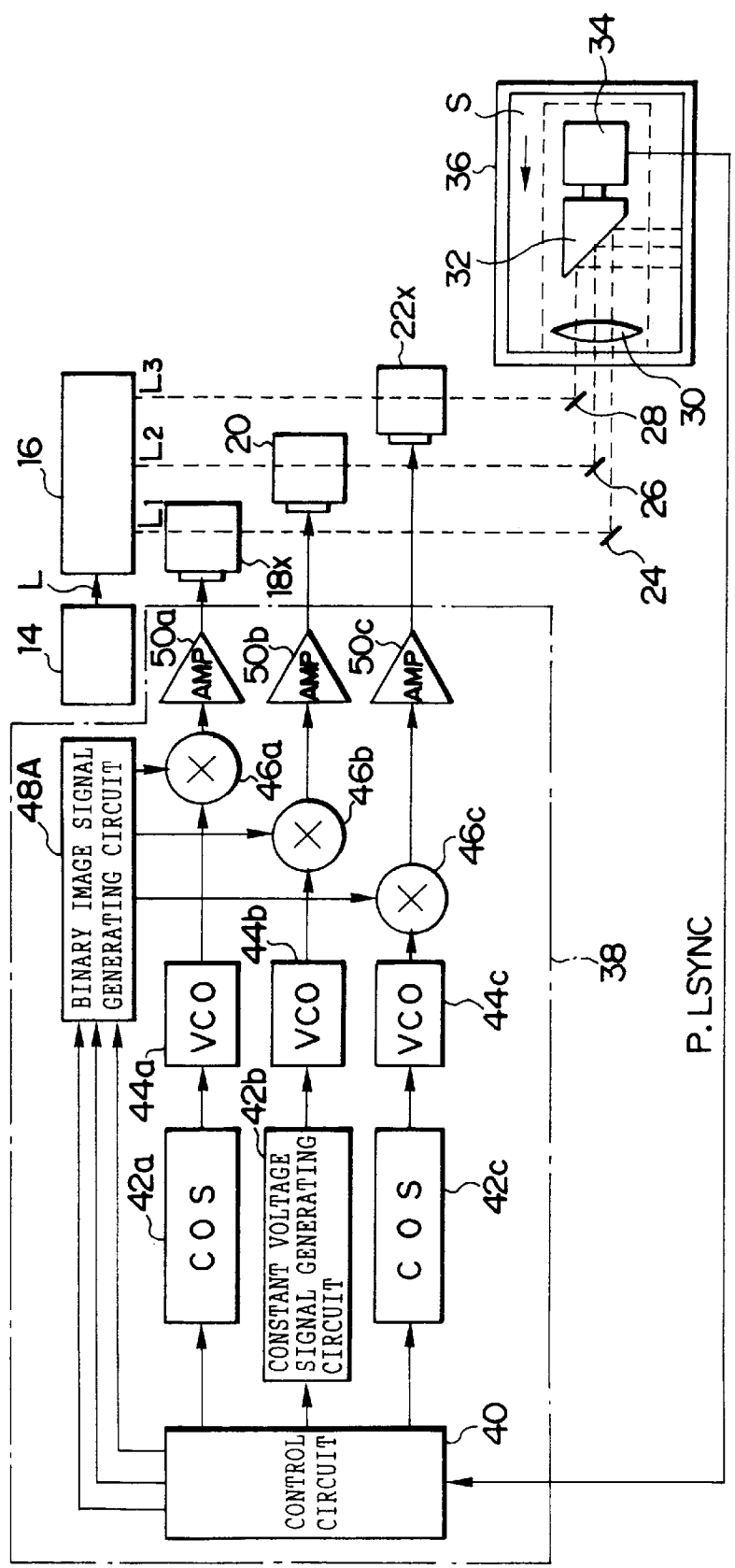
FIG. 10 is a block diagram of a controller of the image recording apparatus according to the embodiment of the present invention.

As shown in FIG. 10, a controller 38 is connected to the transducer of each AOD. The controller 38 comprises a control circuit 40 which generates a reference clock signal and a control clock signal in accordance with a rotating position signal P synchronized to the rotation of the motor from a rotary encoder (not shown) mounted to the motor 34 and a main scanning start signal LSYNC outputted from a main scanning start position, a cosine-wave voltage signal generating circuit 42a which generates a cosine-wave voltage signal (x=−a'cosωt, where a denotes a constant, ω denotes an angular velocity of the motor determined by the reference clock signal, and t denotes an elapsed time) in accordance with the reference clock signal, a cosine-wave voltage signal generating circuit 42c which generates the cosine-wave voltage signal (x=a·cosωt) whose phase is shifted 180° from the phase of the above signal in accordance with the reference clock signal, and a constant voltage signal generating circuit 42b which generates a constant voltage signal.

The voltage signal generating circuits 42a, 42b and 42c are connected to voltage control oscillators (VCO) 44a, 44b and 44c, respectively, which generate a frequency modulating signal from the voltage signals.

Furthermore, the control circuit 40 is connected to a binary image signal generating circuit 48A which generates a binary image signal. The frequency modulating signals outputted from the VOCs 44a, 44b and 44c are On/Off modulated by the binary image signal from the binary image signal generating circuit 48A by modulators 46a, 46b, and 46c. The signals are amplified by amplifying circuits 50a, 50b and 50c. The signals are then inputted to the transducer of each AOD.

As described above, the voltage signal is modulated by the cosine-wave voltage signals (x=−a·cosωt, a cosωt). The modulated voltage signal is applied to the transducers of the AODs 18x and 22x. Therefore, the laser beams passing through the AODs 18x and 22x are deflected from the state shown in FIG. 9 (the position of 0° in FIG. 13A) in the direction of y-axis. At this time, on the recording sheet S, the dots recorded by the laser beam which passes through the AOD 18x are moved in a direction perpendicular to the direction of the dot arrangement. The dots are then moved in the plus direction of x-axis. The dots recorded by the laser beam which passes through the AOD 22x are moved in the direction perpendicular to the direction of the dot arrangement and in the opposite direction to the dots recorded by the laser beam which passes through the AOD 18x. The dots are then moved in the minus direction of x-axis. The deflection offsets a sine-wave shaped single oscillation, thereby allowing the scanning line to be a parallel straight line as shown in FIG. 13B.

Figure 11:
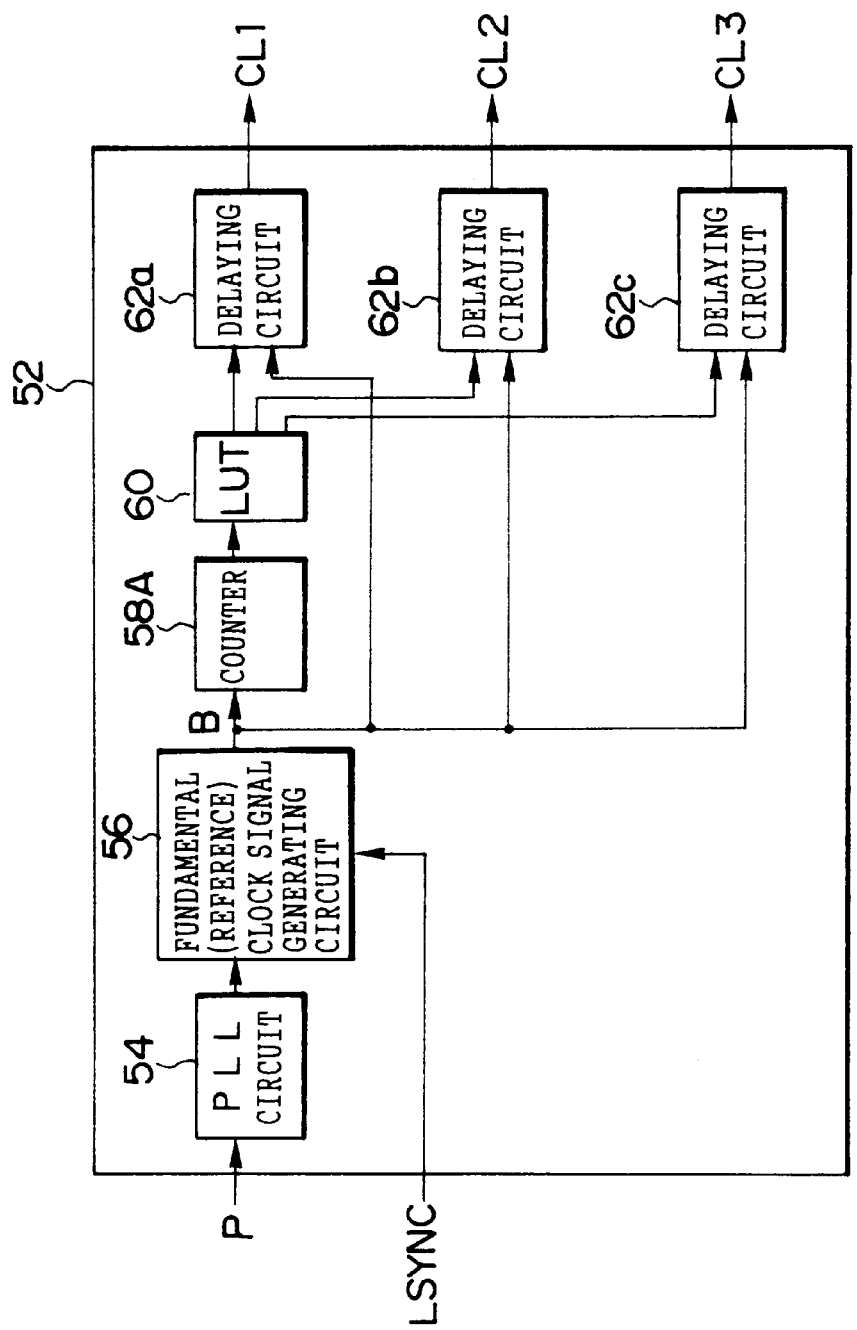
FIG. 11 is a block diagram of a control circuit of the image recording apparatus according to the embodiment of the present invention.

However, the length of the locus formed by each laser beam is different from each other. As the embodiment, the scanning is performed within the range from −90° to +90°. In this case, as shown in FIG. 13B, the locus $R_3$ of the dots recorded by the laser beam $L_3$ is shifted Td1 and Td2 from the loci $R_1$ and $R_2$ of the dots recorded by the laser beams $L_1$ and $L_2$, respectively, on the side of the scanning start end on one line. On the side of the scanning completion end on one line, the locus $R_3$ is shifted Td3 and Td2 from the loci $R_1$ and $R_2$, respectively. Accordingly, the loci are shortened in the order of the locus $R_1$ of the dots recorded by the laser beam $L_1$, the locus $R_2$ of the dots recorded by the laser beam $L_2$ and the locus $R_3$ of the dots recorded by the laser beam $L_3$. Accordingly, the scanning length is different. In the embodiment, for the correction of the difference between the scanning lengths, in the control circuit 40 is a control clock signal generating circuit 52 shown in FIG. 11.

The control clock signal generating circuit 52 comprises a PLL circuit 54 which generates a phase synchronizing signal from the rotating position signal P, a reference clock (fundamental clock) signal generating circuit 56 which generates a reference clock signal B in accordance with the main scanning start signal LSYNC and an output from the PLL circuit 54, a counter 58A which counts the reference clock signal, a look-up table 60 which outputs an amount-of-delay setting signal for setting an amount of delay in accordance with a counted value from the counter 58A, and delaying circuits 62a, 62b, 62c which delay the reference clock signal from the reference clock signal generating circuit 56 in accordance with the amount-of-delay setting signal and output the delayed signal as control clock signals CL1, CL2, CL3. The control clock signals CL1, CL2 and CL3 are supplied to the binary image signal generating circuit 48A.

Figure 13B:
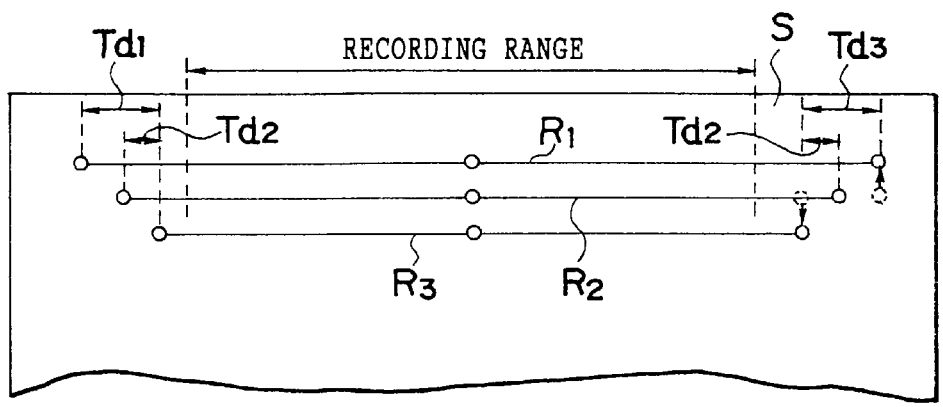
FIG. 13B shows the scanning line when the rotation of the image by the rotating mirror is corrected.

The amount of delay corrects an amount of shift shown in FIG. 13B so as to arrange the dots recorded by the laser beam on the recording sheet in the direction of x-axis. The amount of delay is different in accordance with the main scanning position. Thus, the amount of delay in the look-up table 60 is previously determined for every laser beam in response to the scanning position in a main scanning direction, that is, for each pulse of the reference clock signal.

Figure 12:
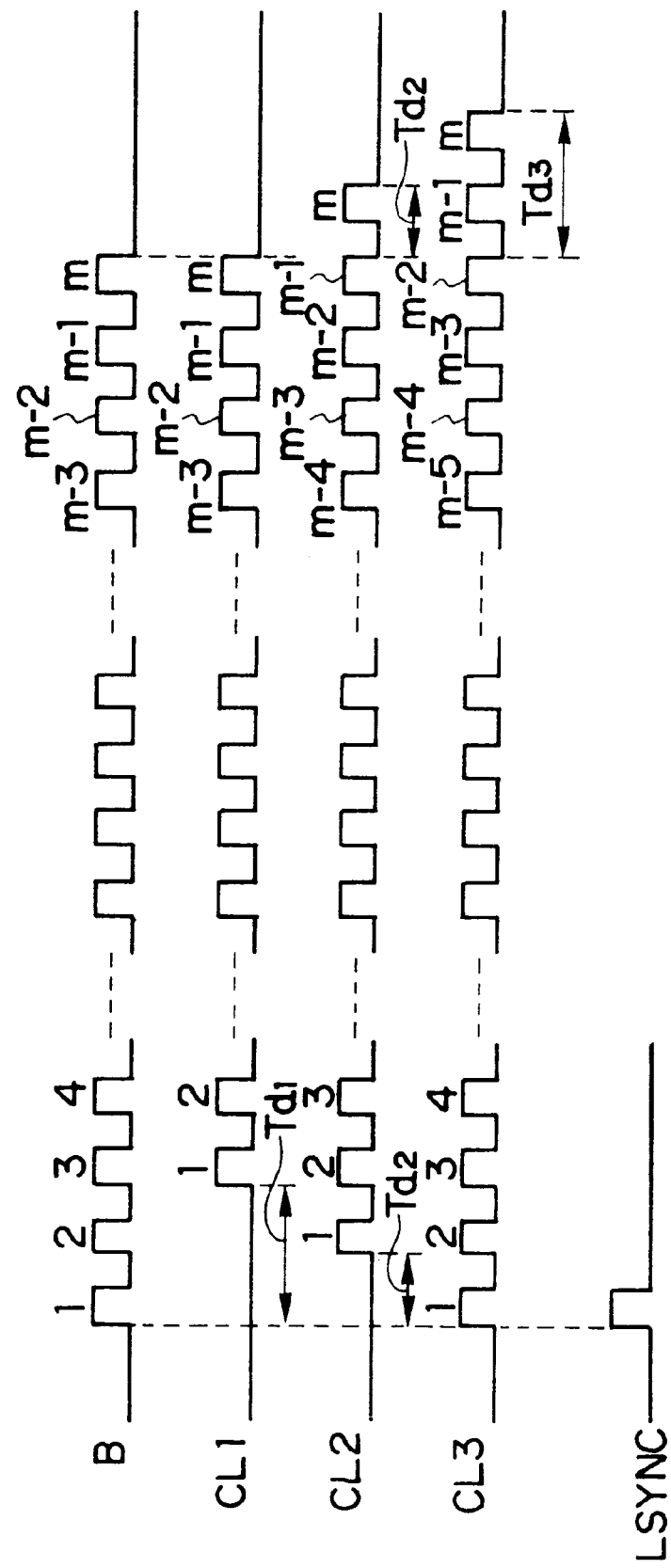
FIG. 12 is a timing chart showing a timing of a control clock signal of the image recording apparatus according to the embodiment of the present invention.

Next, an operation of the image recording apparatus according to the above embodiment will be described. The rotating position signal P from the encoder (not shown) disposed in the motor 34 is inputted to the PLL circuit 54. The rotating position signal P is phase-controlled, so that the phase synchronizing signal is generated. The phase synchronizing signal is inputted to the reference clock signal generating circuit 56. The reference clock signal B shown in FIG. 12 is outputted at a generating timing of the main scanning start signal LSYNC. The reference clock signal is counted by the counter 58A. The reference clock signal is also inputted to the delaying circuits 62a, 62b and 62c.

The counted value of the reference clock signal is counted by the counter 58A. The counted value is supplied to the look-up table 60. The look-up table 60 inputs the amount-of-delay setting signal to each of the delaying circuits 62a, 62b and 62c in response to the counted value, that is, in accordance with the amount of delay which is predetermined for each of the laser beams $L_1$, $L_2$ and $L_3$ in response to a recording position in the main scanning direction on the recording sheet. The delaying circuits 62a, 62b and 62c delay the reference clock signal in response to the inputted amount-of-delay setting signal, so that they output the control clock signals CL1, CL2 and CL3.

The control clock signal CL1 is the signal for controlling an output timing of the binary image signal recorded by the laser beam $L_1$. The delaying circuit 62a outputs the control clock signal CL1. In accordance with the amount-of-delay setting signal, as shown in FIG. 12, the control clock signal CL1 is such that an image recording start time period by the binary image signal recorded by the laser beam $L_1$ is delayed Td1 from the generating timing of the reference clock signal, that is, from the generating timing of the main scanning start signal LSYNC. The control clock signal CL1 is also such that a recording completion time period coincides with a main scanning completion timing (the m-th clock) of the reference clock signal.

The control clock signal CL2 is the signal for controlling the output timing of the binary image signal recorded by the laser beam $L_2$. The delaying circuit 62b outputs the control clock signal CL2. In accordance with the amount-of-delay setting signal, as shown in FIG. 12, the control clock signal CL2 is such that the image recording start time period by the binary image signal recorded by the laser beam $L_2$ is delayed Td2 from the generating timing of the main scanning start signal LSYNC. The control clock signal CL2 is also such that the recording completion time period is delayed Td2 from the main scanning completion timing of the reference clock signal The control clock signal CL3 is the signal for controlling the output timing of the binary image signal recorded by the laser beam $L_3$. The delaying circuit 62c outputs the control clock signal CL3. In accordance with the amount-of-delay setting signal, as shown in FIG. 12, the control clock signal CL3 is such that the image recording start time period by the binary image signal recorded by the laser beam $L_3$ coincides with the generating timing of the main scanning start signal LSYNC. The control clock signal CL3 is also such that the recording completion time period is delayed Td3 from the main scanning completion timing of the reference clock signal.

The amount of delay of the look-up table is set correspondingly to each main scanning position so that a pulse interval between each control clock signal may be spaced as equally as possible. When delaying positions between the adjacent scanning lines are overlapped with each other, a beat is generated between halftone dots, thereby causing a nonuniformity of the image. Therefore, preferably, the amount of the look-up table is set so that it may be random between each scanning line.

The control clock signals CL1, CL2 and CL3, which are outputted as described above, are supplied to the binary image signal generating circuit 48A. The binary image signal generating circuit 48A outputs the binary image signal to each of modulators 46a, 46b and 46c at the timing shown in FIG. 12.

On the other hand, the voltage signal generating circuits 42a and 42c generate the cosine-wave voltage signals (x=−a·cosωt, a cosωt) in accordance with the inputted reference clock signal. The frequency modulating signal is inputted to the modulators 46a and 46c through the VCOs 44a and 44c. The constant voltage signal generating circuit 42b inputs the frequency modulating signal to the modulator 46b through the VCO 44. Thus, the frequency modulating signals outputted from voltage signal generating circuits 48a, 48b and 48c are On/Off modulated in the modulators 46a, 46b and 46c by the binary image signal from the binary image signal generating circuit 48A. The signals are amplified in the amplifying circuits 50a, 50b and 50c. The signals are then inputted to each transducer of each AOD.

The laser beams $L_1$ and $L_3$ are generated from the laser beam generator 14 and split by the beam splitter 16. The laser beams $L_1$ and $L_3$ are deflected in the direction of y-axis by the AODs 18x and 22x. The laser beams $L_1$ and $L_3$ are On/Off modulated in response to the binary image signal. The laser beams $L_1$ and $L_3$ are reflected by the mirrors 24 and 28. The laser beams $L_1$ and $L_3$ are incident on the rotating mirror 32 through the focusing lens 22. The laser beam $L_2$ is On/Off modulated in response to the binary image signal without being deflected by the AOD 20. The laser beam $L_2$ is reflected by the mirror 26. The laser beam $L_2$ is incident on the rotating mirror 32 through the focusing lens 22.

Figure 13C:
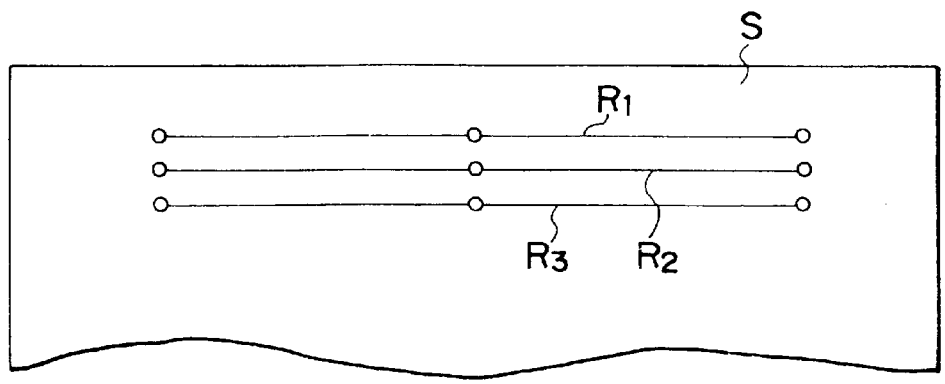
FIG. 13C shows the scanning line when the difference of a scanning length is corrected.

Since the rotating mirror 32 is rotated around the x-axis, the reflection causes the laser beam to be scanned on the recording sheet. In this case, the laser beams $L_1$ and $L_2$, which are On/Off modulated in response to the binary image signal, record the image on the recording sheet within the same recording range (see FIG. 13C) as the range of the laser beam $L_3$. Accordingly, it is possible to record the high-accuracy image which has the same recording range in the main scanning direction and is not distorted.

As described above, according to the embodiment, the AODs are arranged in such a manner that the optical axis of the anisotropic crystal is not parallel to the plane including the direction of propagation of the incident light and the direction of propagation of the ultrasonic wave. Accordingly, it is possible to provide the low-cost cylindrical inner plane scanning type image recording apparatus in which the diffraction efficiency is improved.

The embodiment in which the present invention is applied to the cylindrical inner plane scanning type image recording apparatus is described above. However, the present invention is applicable to the light beam scanning apparatus of a plane scanning type image recording apparatus which carries the recording sheet in an auxiliary scanning direction while scanning the laser beam in the main scanning direction so as to record the image and of a cylindrical outer plane scanning type image recording apparatus which holds the recording sheet on an outer circumferential plane of the drum, rotates the drum while scanning the laser beam in the main scanning direction so as to record the image. In addition, the present invention can be also applied to various reading apparatuss which scans the laser beam so as to read the image.

As described above, acousto-optic elements are arranged so that the optical axis of the anisotropic crystal may not be parallel to the plane including the direction of propagation of the incident light and the direction of propagation of the ultrasonic wave. Accordingly, without increasing the anisotropic crystal, a straight polarized light is used, so that the acousto-optic element can be provided in which the diffraction efficiency is further improved and the cost is low.

Furthermore, since the acousto-optic elements arranged as described above are used, it is possible to provide the low-cost light beam scanning apparatus and image recording apparatus in which the diffraction efficiency is further improved.

Next, in order to two-dimensionally polarize the incident light, the above-described acousto-optic deflecting element is defined as a first acousto-optic deflecting element. The first acousto-optic deflecting element is combined with a second acousto-optic deflecting element according to a second invention (the light deflector according to the present invention). In this case, the deflector (On- [110] type $TeO_2$ light deflecting element), which is constructed similarly to the first acousto-optic deflecting element, is applied as the second acousto-optic deflecting element. Such a case is exemplarily described. Hereinafter, the first acousto-optic deflecting element is referred to as a first AOD. The second acousto-optic deflecting element is referred to as a second AOD.

Figure 14:
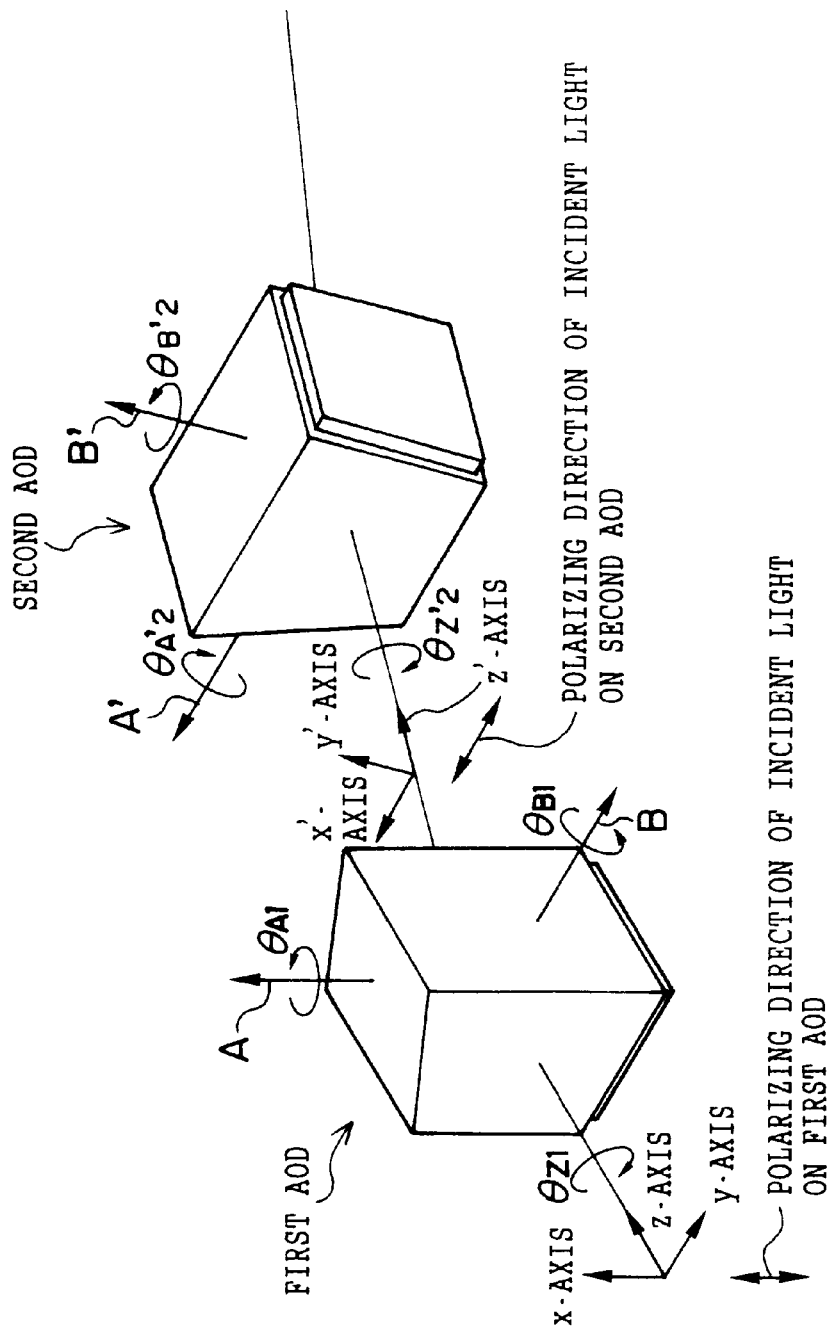
FIG. 14 is a perspective view of a light deflector for illustrating the axis which rotates each AOD in the light deflector in which a first and a second AODs are tandem arranged.

As shown in FIG. 14, the second AOD is arranged so that a diffracted light emitted from the first AOD may be incident on the second AOD. For the second AOD, an x'y'z' coordinate system is defined. The x'y'z' coordinate system comprises a z'-axis which coincides with the direction of propagation of the incident light on the second AOD, an x'-axis which coincides with the polarizing direction of the incident light on the second AOD (in FIG. 14, conveniently, the polarizing direction of the incident light on the second AOD is shown shifting 90° from the polarizing direction of the incident light on the first AOD), and a y'-axis which is defined as the right-handed system from the z'-axis and x'-axis. Furthermore, the direction of propagation of the ultrasonic wave, that is, the [110] axial direction of the crystal coincides with the direction of x'-axis. The optical axis, that is, the [001] axial direction coincides with the direction of z'-axis. Such a state is defined as the initial state of the second AOD (see FIG. 1).

In order to distinguish from an attitude angle in relation to the second AOD, the Bragg angle, the warping angle and the rotating angle around the axis in the direction of propagation of the incident light to the first AOD are defined as $\theta_{B1}$, $\theta_{A1}$ and $\theta_{A1}$, respectively. Like the Bragg angle $\theta_{B1}$, the warping angle $\theta_{A1}$ and the rotating angle $\theta_{Z1}$ around the axis in the direction of propagation of the incident light to the first AOD, three angles around the axes for adjusting the attitude of the second AOD from the above-described state are defined. A Bragg angle $\theta_{B'2}$ represents the rotation of the second AOD on the plane which is formed by the direction of propagation (z'-axis) of the incident light on the second AOD and the direction of propagation of the ultrasonic wave (the rotation around an axis B' perpendicular to the plane formed by the z'-axis and the direction of propagation of the ultrasonic wave). A warping angle $\theta_{A'2}$ represents the rotation around the direction of propagation of the ultrasonic wave, that is, the rotation around an axis A' in the [110] axial direction. The rotating angle $\theta_{Z'2}$ around the axis in the direction of propagation of the incident light represents the rotation in the direction of propagation of the incident light on the second AOD, that is, the rotation around the z'-axis.

Figure 15:
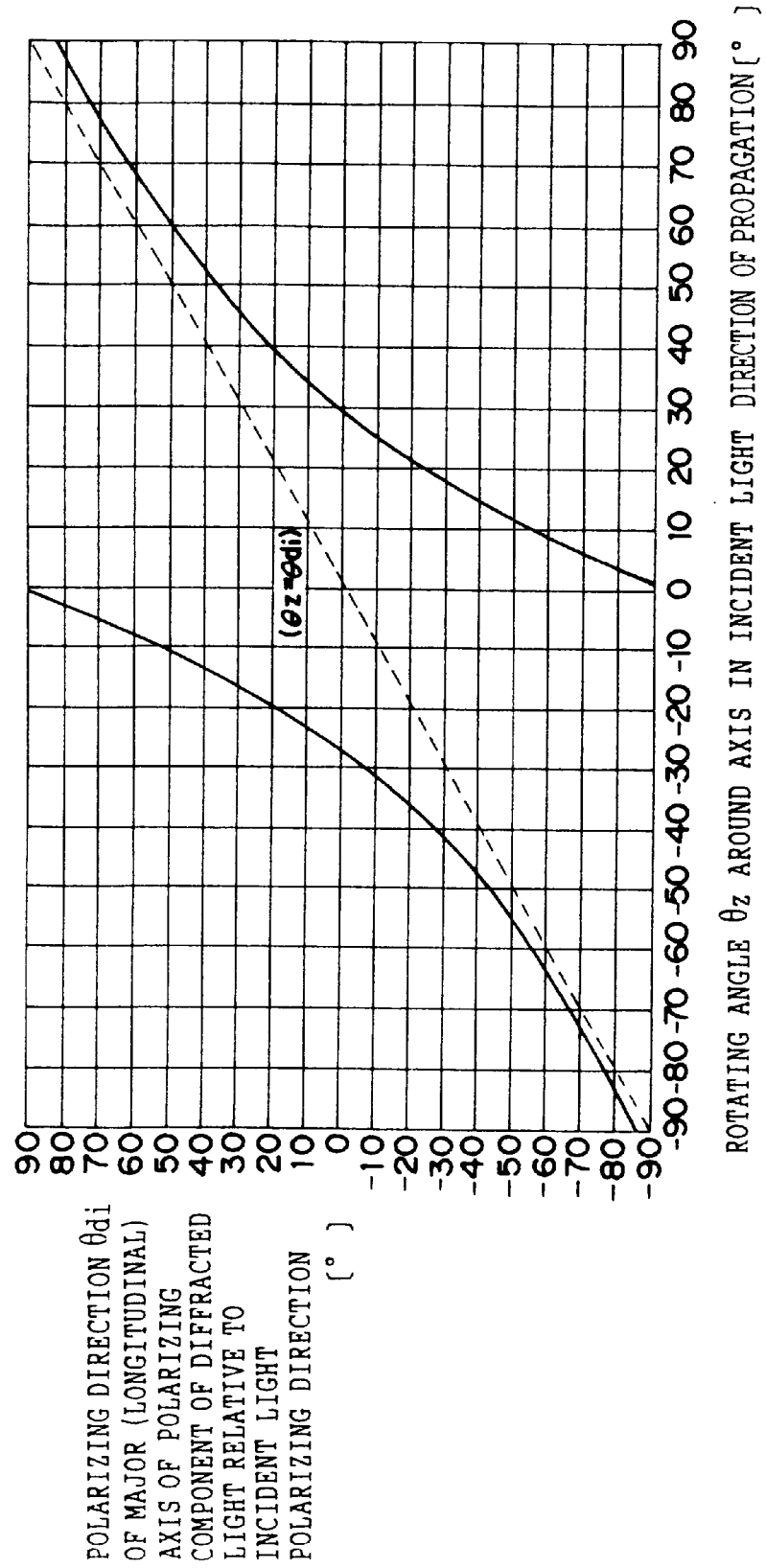
FIG. 15 is a graph showing the change in a polarizing direction $\theta_{di}$ of a longitudinal axis of a diffracted light emitted from the AOD when the rotating angle $\theta_Z$ around the axis in the direction of propagation of the incident light is changed (where it should be noted that the polarizing direction of the incident light is defined as a reference (=0°)).
Figure 16:
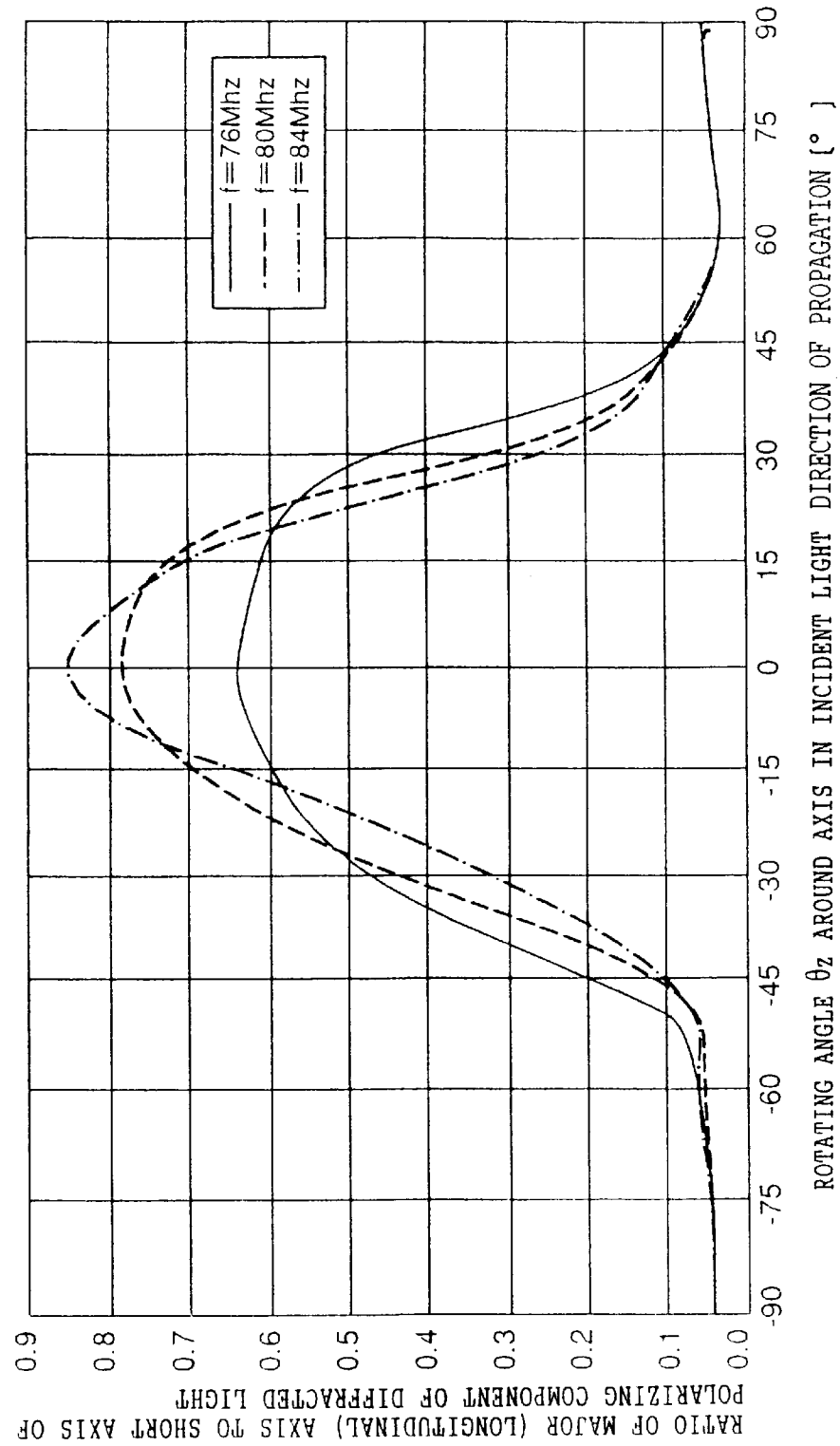
FIG. 16 is a graph showing each change in a ratio of the longitudinal axis to a short axis of a polarizing component of the diffracted light when a driving frequency is defined as each value and the rotating angle $\theta_Z$ around the axis in the direction of propagation of the incident light is changed.

The x'y'z' coordinate system for the second AOD is defined by the polarizing direction (and the emitting direction) of the diffracted light emitted from the first AOD. Accordingly, at the determination of the attitude of the second AOD, the polarizing direction and polarizing state (either the straight polarized light or an elliptical polarized light) of the diffracted light emitted from the first AOD cause the problem. FIG. 15 shows the change in a polarizing direction $\theta_{di}$ of a longitudinal axis of the diffracted light emitted from the AOD when the rotating angle $\theta_Z$ around the axis in the direction of propagation of the incident light on the AOD is changed (where it should be noted that the polarizing direction of the incident light is defined as a reference (=0°)). FIG. 16 shows the change in a ratio of the longitudinal axis to a short axis of a polarizing component of the diffracted light when the rotating angle $\theta_Z$ around the axis in the direction of propagation of the incident light on the AOD is changed.

From the relationship shown in FIGS. 15 and 16, the rotating angle around the axis in the direction of propagation of the incident light on the first and second AODs and the warping angle are adjusted so that the following conditions may be satisfied. In such a manner, it is appreciated that the deflecting directions of the first and second AODs are perpendicular to each other, and the high diffraction efficiency can be obtained.

The first AOD: $\theta_{Z1} \doteq +80°$, $\theta_{A1} \doteq +10°$

The second AOD: $\theta_{Z2} \doteq -10°$ (: $\theta_{Z'2} \doteq -80°$), $\theta_{A'2} \doteq +10°$ $\theta_{Z2}$ denotes the angle when the rotating angle $\theta_{Z'2}$ around the axis in the direction of propagation of the incident light on the second AOD is viewed from the xyz coordinate system (when the polarizing direction of the incident light on the first AOD is defined as 0°). The above conditions will be described with reference to FIGS. 17A through 17E.

Figure 17A:
FIG. 17A is a conceptual view showing the polarizing direction of the incident light to the first AOD for illustrating conditions so that the deflecting directions of the first and second AODs of the light deflector may be perpendicular to each other and the high diffraction efficiency may be obtained.
Figure 17B:
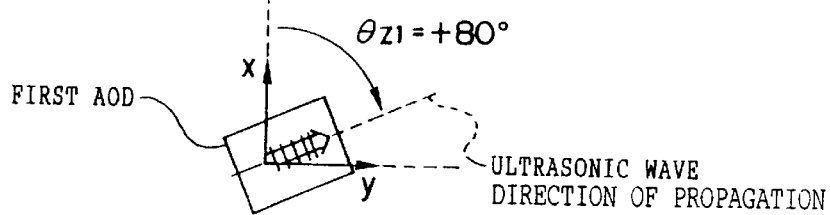
FIG. 17B is a conceptual view showing an attitude of the first AOD for illustrating the above-described conditions.
Figure 17C:
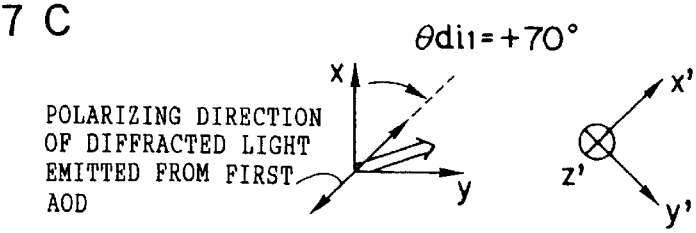
FIG. 17C is a conceptual view showing the polarizing direction of the diffracted light emitted from the first AOD for illustrating the above-described conditions.
Figure 17D:
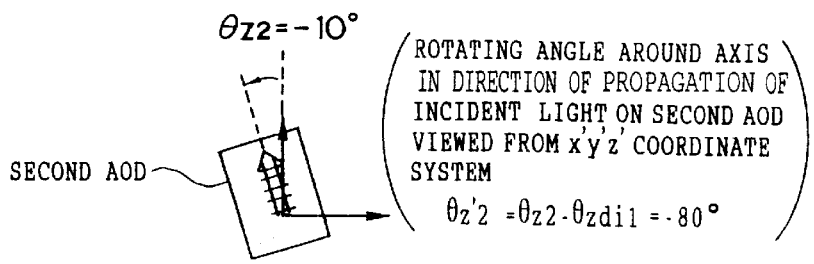
FIG. 17D is a conceptual view showing the attitude of the second AOD for illustrating the above-described conditions.
Figure 17E:
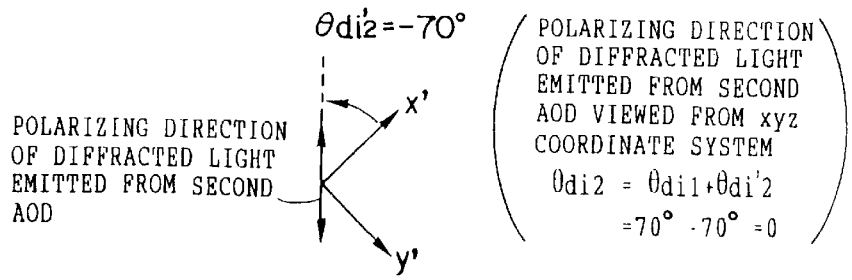
FIG. 17E is a conceptual view showing the polarizing direction of the diffracted light emitted from the second AOD for illustrating the above-described conditions.

FIGS. 17A–17E are illustrations for describing the case that the attitude of the first and second AODs is adjusted in accordance with the above conditions. FIG. 17A shows the polarizing direction of the incident light on the first AOD. FIG. 17B shows the attitude of the first AOD. FIG. 17C shows the polarizing direction of the diffracted light emitted from the first AOD. FIG. 17D shows the attitude of the second AOD. FIG. 17E shows the polarizing direction of the diffracted light emitted from the second AOD. Conventionally, a vertical direction is defined as the direction of propagations of the incident light and the diffracted light in the drawing. Each of FIGS. 17A–17E is conceptually shown.

As shown in FIG. 17A, when the polarizing direction of the incident light on the first AOD is defined as an upper-and-lower direction in FIGS. 17A–17E, the xyz coordinate system for the first AOD is defined as shown in FIG. 17A. The angle around the axis in the direction of propagation of the incident light on the first AOD is $\theta_{Z1} \doteq +80°$ from the above conditions. Accordingly, as shown in FIG. 17B, the first AOD is rotated by +80° around the axis in the direction of propagation of the incident light so that the first AOD is arranged. In FIG. 17B, a white arrow denotes the direction of propagation of the ultrasonic wave. The optimum warping angle $\theta_{A1}$ for the angle $\theta_{Z1} \doteq +80°$ around the axis in the direction of propagation of the incident light on the first AOD is $\theta_{A1} \doteq +10°$ from FIG. 5. As also clarified from FIG. 4, the first AOD is adjusted to the above-described attitude angle, so that the diffraction efficiency in the first AOD is the high value near the peak.

When the first AOD is adjusted to the above-described attitude angle, the polarizing direction (of the longitudinal axis) of the diffracted light emitted from the first AOD is $\theta_{di1} \doteq +70°$ from FIG. 15 (see FIG. 17C). As also clarified from FIG. 16, the diffracted light can be considered as the substantially straight polarized light. The polarizing direction of the diffracted light is defined as the reference, so that the x'y'z' coordinate system for the second AOD is determined as shown in FIG. 17C.

In order that the incident light may be two-dimensionally deflected by the first and second AOD, the deflecting directions of the first and second AODs are required to at least cross each other (preferably, cross at right angles). When the deflecting directions of the second AODs cross at right angles to the deflecting direction of the first AOD, a rotating angle $\theta_{Z2}$ around the axis in the direction of propagation of the incident light on the second AOD, which is viewed from the xyz coordinate system, is defined as $\theta_{Z2}=\theta_{Z1}-90°\doteq-10°$. The polarizing direction $\theta_{di1}$ of the diffracted light emitted from the first AOD is $\theta_{di1}\doteq+70°$. Accordingly, when the polarizing direction is defined as the reference, the rotating angle $\theta_{Z'2}$ around the axis in the direction of propagation of the incident light on the second AOD (viewed from the z'y'z' coordinate system) is $\theta_{Z'2}=\theta_{Z2}-\theta_{di1}\doteq-80°$.

Furthermore, the optimum warping angle $\theta_{A'2}$ for the angle $\theta_{Z'2}\doteq-80°$ around the axis in the direction of propagation of the incident light on the second AOD is $\theta_{A'2}\doteq-10°$ from FIG. 5. As also clarified from FIG. 4, the second AOD is adjusted to the above-described attitude angle, so that the diffraction efficiency in the second AOD for the diffracted light emitted from the first AOD is the high value near the peak. As also clarified from FIG. 15, when the polarizing direction of the incident light on the second AOD is defined as the reference, a polarizing direction $\theta_{di'2}$ of the diffracted light emitted from the second AOD is $\theta_{di'2}\doteq-70°$. Accordingly, the polarizing direction $\theta_{di2}$ of the diffracted light emitted from the second AOD, which is viewed from the xyz coordinate system, is $\theta_{di2}=\theta_{di1}+\theta_{di'2}\doteq0°$. Therefore, the polarizing direction of the diffracted light emitted from the second AOD generally coincides with the polarizing direction of the incident light on the first AOD.

Figure 18:
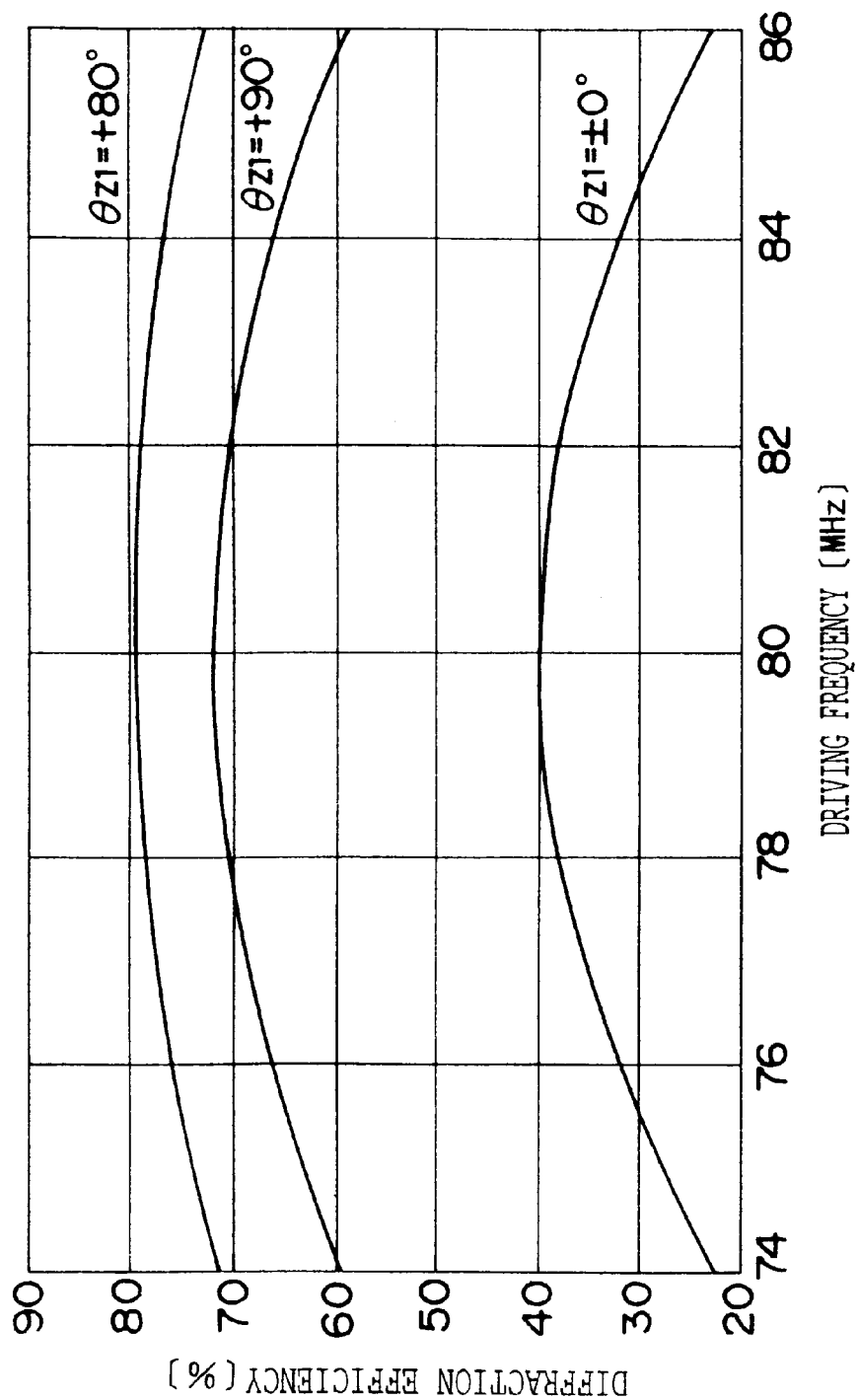
FIG. 18 is a graph showing each change in the total diffraction efficiency (of the light deflector) of the first and second AODs when a rotating angle $\theta_{Z1}$ around the axis in the direction of propagation of the incident light on the first AOD is defined as +80°, +90° and ±0° and the driving frequency is changed in a predetermined frequency band.

FIG. 18 shows the frequency characteristics of the total diffraction efficiency of the first and second AODs when the first and second AODs are tandem-arranged. A curved line, which is represented by $\theta_{Z1}=\pm80°$ in FIG. 18, shows the frequency characteristics when the first and second AODs are arranged under the above-described conditions. As clarified by comparing with the frequency characteristics (the curved line represented by $\theta_{Z1}=\pm0°$) of the diffraction efficiency according to a conventional arranging method, the diffraction efficiency is more greatly improved than the conventional diffraction efficiency at any frequency in a predetermined frequency band.

Although the case of $\theta_{Z1}=+80°$ is exemplarily described above, the improvement of both the diffraction efficiency of the first and second AODs is not limited to the above conditions. For example, when $\theta_{Z1}=-80°$, there are present conditions which can obtain the equivalent diffraction efficiency to the above conditions. In the case of the Bragg angle $\theta_B<0$, there are present conditions which can obtain the equivalent diffraction efficiency to the above conditions. In addition, the value $\theta_{Z1}$ is not limited to $|\theta_{Z1}|=80°$. For example, the value $\theta_{Z1}$ may be $|\theta_{Z1}|=70°$ or $|\theta_{Z1}|=85°$.

The curved line, which is represented by $\theta_{Z1}=+90°$ in FIG. 18, shows the case that the rotating angle $\theta_{Z1}$ around the axis in the direction of propagation of the incident light on the first AOD is defined as $\theta_{Z1}=+90°$ and the rotating angle $\theta_{Z2}$ around the axis in the direction of propagation of the incident light on the second AOD is defined as $\theta_{Z2}=+0°$. For each of the first and second AODs, in response to the rotating angles $\theta_{Z1}$ and $\theta_{Z2}$ (exactly, $\theta_{Z'2}$) around the axis in the direction of propagation of the incident light, the warping angle is more appropriately adjusted than FIG. 5. Thus, in this case, the diffraction efficiency is also improved more than the conventional diffraction efficiency.

Furthermore, the deflecting directions of the first and second AODs may not always cross at right angles. Under the condition that the deflecting directions of the first and second AODs cross each other, the attitudes of the first and second AODs may be arranged in such a manner that each diffraction efficiency in the first and second AODs is generally maximum. For example, when the rotating angles around the axes in the direction of propagations of the incident lights on the first and second AODs and the warping angles are adjusted so as to satisfy the following conditions, although the deflecting directions of the first and second AODs cross each other, not cross at right angles, each diffraction efficiency in the first and second AODs is generally maximum. Accordingly, the light deflector can obtain the still higher diffraction efficiency.

The first AOD: $\theta_{Z1}\doteq+70°$, $\theta_{A1}\doteq+10°$

The second AOD: $\theta_{Z2}\doteq-5°$ (: $\theta_{Z'2}\doteq-70°$), $\theta_{A'2}\doteq+10°$ The above conditions will be described with reference to FIGS. 19A through 19E. FIG. 19 shows the case that the attitudes of the first and second AODs are adjusted under the above conditions. FIG. 19A shows the polarizing direction of the incident light on the first AOD. FIG. 19B shows the attitude of the first AOD. FIG. 19C shows the polarizing direction of the diffracted light emitted from the first AOD. FIG. 19D shows the attitude of the second AOD. FIG. 19E shows the polarizing direction of the diffracted light emitted from the second AOD. Conventionally, the vertical direction is defined as the direction of propagations of the incident light and the diffracted light in the drawing. Each of FIGS. 19A–19E is conceptually shown.

As shown in FIG. 19A, when the polarizing direction of the incident light on the first AOD is defined as the upper-and-lower direction in FIG. 19A, the xyz coordinate system for the first AOD is defined as shown in FIG. 19A. The angle around the axis in the direction of propagation of the incident light on the first AOD is $\theta_{Z1}\doteq+70°$ from the above conditions. Accordingly, as shown in FIG. 19B, the first AOD is rotated by $+70°$ around the axis in the direction of propagation of the incident light. In FIG. 19B, the white arrow denotes the direction of propagation of the ultrasonic wave. The optimum warping angle $\theta_{A1}$ for the angle $\theta_{Z1}\doteq+70°$ around the axis in the direction of propagation of the incident light on the first AOD is $\theta_{A1}\doteq+10°$ from FIG. 5. As also clarified from FIG. 4, the first AOD is adjusted to the above-described attitude angle, so that the diffraction efficiency in the first AOD is generally maximum.

When the first AOD is adjusted to the above-described attitude angle, the polarizing direction (of the longitudinal axis) of the diffracted light emitted from the first AOD is $\theta_{di1}\doteq+65°$ from FIG. 15 (see FIG. 19C). As also clarified from FIG. 16, the diffracted light can be considered as the substantially straight polarized light. The polarizing direction of the diffracted light is defined as the reference, so that the x'y'z' coordinate system for the second AOD is determined as shown in FIG. 19C.

For the diffracted light emitted from the first AOD, when the diffraction efficiency of the second AOD is maximum, the rotating angle $\theta_{Z'2}$ around the axis in the direction of propagation of the incident light on the second AOD, which is viewed from the x'y'z' coordinate system, as clarified from FIG. 4, is $\theta_{Z'2}\doteq+70°$ or $-70°$. In order that the incident light may be two-dimensionally deflected by the first and second AODs, the deflecting directions of the first and second AODs are required to at cross each other. Since, preferably, a crossing angle is as close to 90° as possible, the value $\theta_{Z'2}$ is defined as $\theta_{Z'2}\doteq-70°$ (see FIG. 19D) . Furthermore, the optimum warping angle $\theta_{A'2}$ for the angle $\theta_{Z'2}\doteq-70°$ around the axis in the direction of propagation of the incident light on the second AOD is $\theta_{A'2}\doteq-10°$ from FIG. 5.

Since the polarizing direction $\theta_{di1}$ (of the longitudinal axis) of the diffracted light emitted from the first AOD is $\theta_{di1} \doteq +65°$. Accordingly, the rotating angle $\theta_{Z2}$ around the axis in the direction of propagation of the incident light on the second AOD, which is viewed from the xyz coordinate system, is $\theta_{Z2}=\theta_{di1}+\theta_{Z'2} \doteq -5°$. The crossing angle of the deflecting directions of the first and second AODs is the crossing angle $=\theta_{Z1}-\theta_{Z2} \doteq 75°$ (see FIG. 19E). As also clarified from FIG. 4, the first and second AODs are adjusted to the attitude angle, so that each diffraction efficiency of the first and second AODs is generally maximum. Accordingly, the diffraction efficiency is generally maximum in the light deflector in which the first and second AODs are tandem-arranged.

As also clarified from FIG. 15, when the polarizing direction of the incident light on the second AOD is defined as the reference, the polarizing direction $\theta_{di'2}$ of the diffracted light emitted from the second AOD is $\theta_{di'2} \doteq -65°$. Thus, the polarizing direction $\theta_{di2}$ of the diffracted light emitted from the second AOD, which is viewed from the xyz coordinate system, is $\theta_{di2}=\theta_{di1}+\theta_{di'2} \doteq 0°$. Accordingly, the polarizing direction generally coincides with the polarizing direction of the incident light on the first AOD.

The deflecting directions of the first and second AODs in the light deflector do not cross at right angles. In this case, as described below, a driving signal, in which the phase for frequency modulation is shifted and an amplitude is adjusted, is supplied to at least either the first or second AOD. This allows the incident light on the light deflector to be two-dimensionally deflected along two directions which are perpendicular to each other.

As described above, in the light deflector in which the first and second AODs are tandem-arranged, each AOD is arranged so that the anisotropic Bragg diffraction can be used. In addition, each AOD is arranged so that the optical axis of the anisotropic crystal of each AOD may not be parallel to the plane including the direction of propagation of the incident light on each AOD and the direction of propagation of the ultrasonic wave in the anisotropic crystal of each AOD. Accordingly, the diffraction efficiency of the light deflector can be improved.

Next, an embodiment of the cylindrical inner plane scanning type image recording apparatus in which the above-described light deflector is used will be described with reference to the accompanying drawings. As shown in FIG. 20, the image recording apparatus according to the embodiment comprises the laser beam generator 14 which generates the laser beam L and the laser beam splitter 16 which splits the laser beam generated from the laser beam generator 14 into three laser beams $L_1$, $L_2$ and $L_3$.

On the side that the laser beam $L_1$ is emitted, a deflector 18 is disposed. The deflector 18 comprises a first AOD 18x which deflects the laser beam $L_1$ in the corresponding direction to the direction of X-axis in an XYZ coordinate system that is set for the laser beam to be incident on the rotating mirror 32 (the rotating mirror 32 is described below), and a second AOD 18y which deflects the laser beam $L_1$ diffracted in the first AOD 18x in the corresponding direction to the direction of Y-axis and strength-modulates (On/Off modulates) the laser beam in response to the image information.

On the side that the laser beam $L_2$ is emitted, the AOD 20 is disposed. The AOD 20 On/Off modulates the laser beam in response to the image information without deflecting the laser beam $L_2$. On the side that the laser beam $L_3$ is emitted, a light deflector 22 is disposed. The light deflector 22 comprises a first AOD 22x which deflects the laser beam $L_3$ in the corresponding direction to the direction of X-axis and a second AOD 22y which deflects the laser beam $L_3$ diffracted by the first AOD 22x in the corresponding direction to the direction of Y-axis and On/Off modulates the laser beam in response to the image information.

As shown in FIG. 21, the first AOD 18x and the second AOD 18y of the light deflector 18 are mounted in the same package 18A with each attitude adjusted. Although the illustration is omitted, the first AOD 22x and the second AOD 22y of the light deflector 22 are also mounted in the same package with each attitude adjusted. Accordingly, the attitude of the package of each light deflector for the incident light is adjusted, so that the adjustment of the attitudes of the first and second AODs is completed. Accordingly, it is possible to easily manufacture the image recording apparatus according to the embodiment.

In the embodiment, each attitude of the first AOD 18x and the second AOD 18y of the light deflector 18 and the first AOD 22x and the second AOD 22y of the light deflector 22 in each package is adjusted so that it may satisfy the above-described conditions. That is, the Bragg angle $\theta_B$ is $\theta_B \doteq 4°$, the rotating angle $\theta_{Z1}$ around the axis in the direction of propagation of the incident light on the first AOD is $\theta_{Z1} \doteq +80°$, the warping angle $\theta_{A1}$ of the first AOD is $\theta_{A1} \doteq +10°$, the rotating angle $\theta_{Z2}$ around the axis in the direction of propagation of the incident light on the second AOD is $\theta_{Z2} \doteq -10°$ and the warping angle $\theta_{A'2}$ of the second AOD is $\theta_{A'2} \doteq +10°$.

On the side that the laser beams are emitted from the light deflector 18, the AOD 20 and the light deflector 22, the mirrors 24, 26 and 28 which reflect each laser beam in the minus direction of x-axis are disposed. On the side that the laser beams are reflected from these mirrors, the focusing lens 30 and the cylindrical rotating mirror 32 are disposed. The focusing lens 30 focuses each of the laser beams which are reflected from each mirror. The rotating mirror 32 is provided with the reflecting surface inclining 45° in relation to the axis and is rotated around the axis by the motor 34. The recording sheet S is held on the inner circumferential surface of the cylindrical drum 36 shown by the exploded view. The rotating mirror 32 is disposed so that the axis thereof may coincide with the central axis of the drum 36.

Figure 22A:
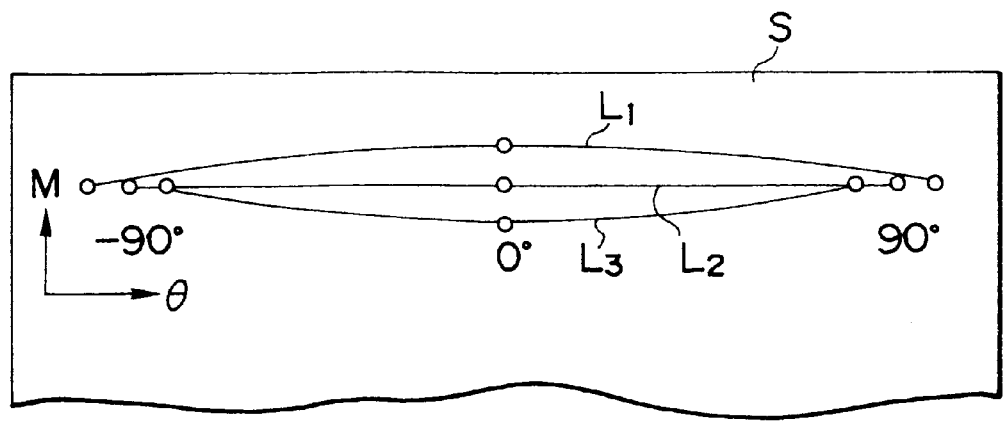
FIG. 22A is a plan view showing the scanning line which is recorded on a recording sheet by three laser beams deflected by the rotating mirror.

In the image recording apparatus, the dots are recorded by the laser beam, and the dots are then arranged on the recording sheet S in a direction of M. When the rotating mirror 32 is rotated by 90° from this state (the state shown in FIG. 20), the rotation of the rotating mirror 32 causes the dot arrangement to be rotated by 90° as shown in FIG. 22A. That is, the dot arrangement is rotated with the rotation of the rotating mirror 32. The dots are recorded by the laser beams $L_1$ and $L_3$ which are not incident on the center of the reflecting surface of the rotating mirror 32. The dots are simple harmonic motion. The locus of the dots recorded by the laser beams $L_1$ and $L_3$ is sine-wave in shape.

Figure 22B:
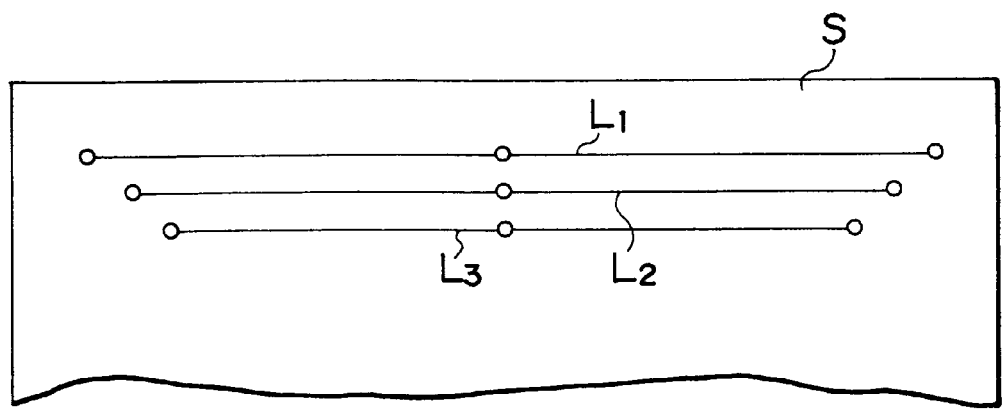
FIG. 22B is a plan view showing the scanning line when the laser beam is deflected in the corresponding direction to a direction of x-axis so as to correct the rotation of the image.
Figure 22C:
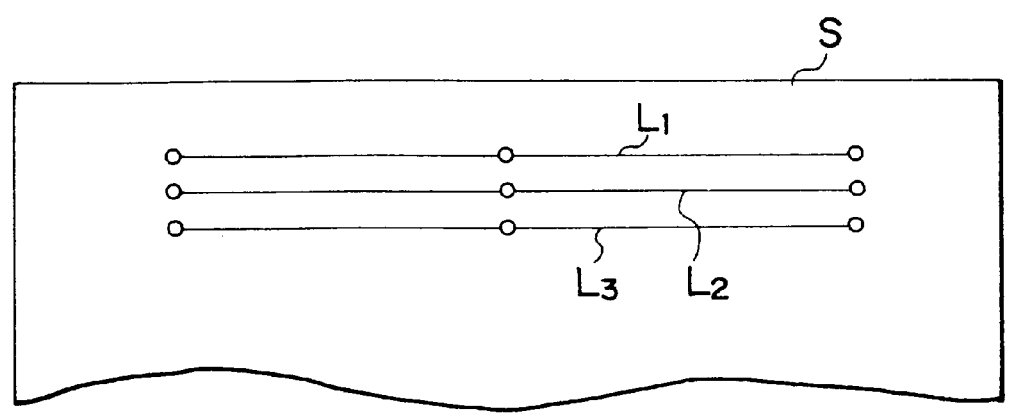
FIG. 22C is a plan view showing the scanning line when the laser beam is two-dimensionally deflected so as to also correct a scanning line length.
Figure 23A:
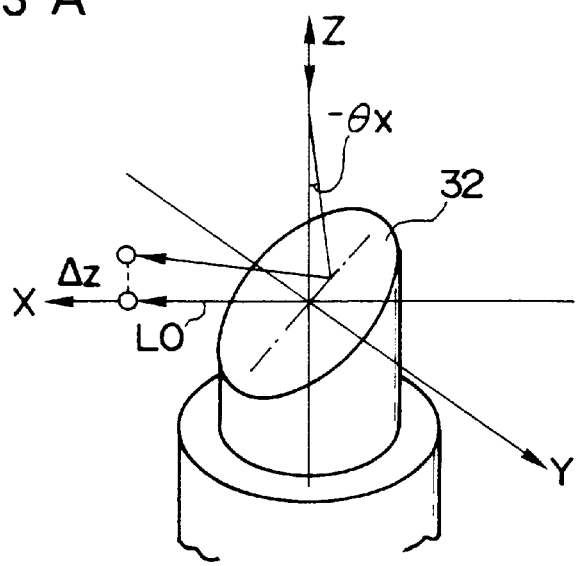
FIG. 23A is a perspective view showing the case that an incident direction of a laser beam LO, which is incident on a reflecting plane of the rotating mirror, is displaced in the direction of X-axis by $-\theta_X$.

On the contrary, the reflecting surface of the rotating mirror 32 looks toward in the direction shown in FIG. 23A (the short axis of the reflecting plane coincides with the Y-axis), and a laser beam L0 is incident on the center of the reflecting surface along a Z-axis. In this case, if the incident direction of the laser beam L0 to the rotating mirror 32 is displaced by $-\theta_x$ in the direction of X-axis, the laser beam reflected by the reflecting surface irradiates the flat surface perpendicular to the X-axis, so that the irradiation position is displaced by $+\Delta_z$ along the direction of the Z-axis. The direction of the displacement of the laser beam irradiation position looks toward in the direction of M shown in FIGS. 20A and 22A through 22C (the direction perpendicular to the scanning direction (direction of θ) of the laser beam resulted from the rotation of the rotating mirror 32), when the surface perpendicular to the X-axis is the recording sheet S.

Accordingly, the laser beam $L_1$ is deflected in the corresponding direction to the direction of X-axis by the first AOD 18X of the light deflector 18, and the amount of deflection is changed into a cosine-wave in shape so that the sine-wave shaped oscillation may be offset. In such a manner, the locus of the laser beam $L_1$ shown in FIG. 22A can be a straight line extending along the scanning direction. Furthermore, the laser beam $L_3$ is deflected in the corresponding direction to the direction of X-axis by the first AOD 22X of the light deflector 22, and the amount of deflection is changed into the cosine-wave in shape so that the sine-wave shaped oscillation may be offset. In such a manner, the locus of the laser beam $L_3$ shown in FIG. 22A can be the straight line extending along the scanning direction.

This allows the three scanning lines formed by the laser beams $L_1$, $L_2$ and $L_3$ to be parallel to one another. However, the positions of the ends of the scanning lines formed by each laser beam are shifted from one another as shown in FIG. 22B. In order to line up the ends of the scanning lines, the laser beam irradiation position on the recording sheet S is also required to be displaced in the scanning direction (direction of θ).

Figure 23B:
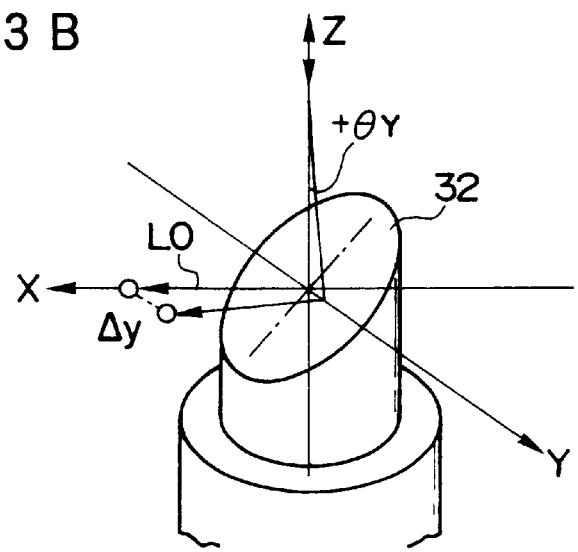
FIG. 23B is a perspective view showing the case that the above-described incident direction is displaced in the direction of Y-axis by $+\theta_Y$.

On the other hand, the reflecting surface of the rotating mirror 32 looks toward in the direction shown in FIG. 23B (the short axis of the reflecting surface coincides with the Y-axis, that is, the same direction as the direction shown in FIG. 23 described above), and the laser beam L0 is incident on the center of the reflecting surface along the Z-axis. In this case, if the incident direction of the laser beam L0 to the rotating mirror 32 is displaced by $+\downarrow_y$ in the direction of Y-axis, the laser beam reflected by the reflecting surface irradiates the flat surface perpendicular to the X-axis, so that the irradiation position is displaced by +Δy along the direction of the Y-axis. The direction of the displacement of the laser beam irradiation position looks toward in the direction of θ shown in FIGS. 20 and 22A through 22C (the scanning direction of the laser beam resulted from the rotation of the rotating mirror 32), when the surface perpendicular to the X-axis is the recording sheet S.

Figure 23C:
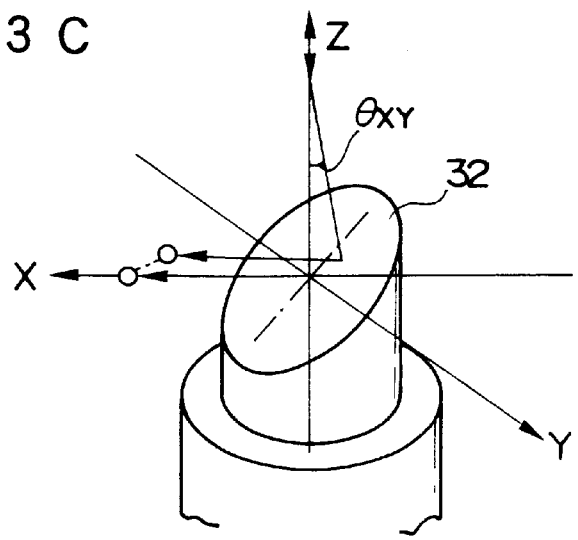
FIG. 23C is a perspective view showing the case that the above-described incident direction is displaced in the directions of X- and Y- axes by $+\theta_{XY}$.
Figure 24A:
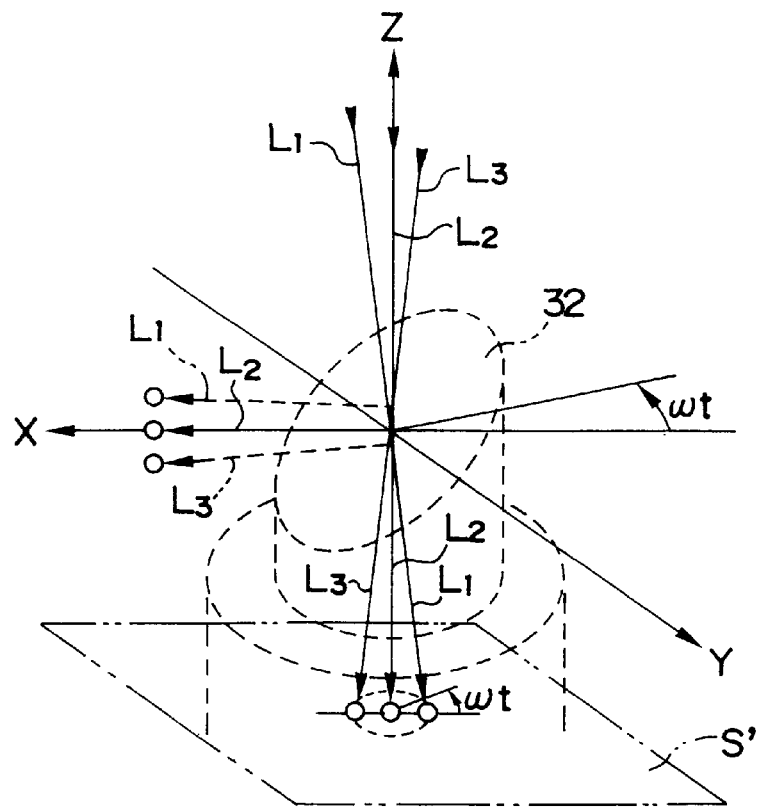
FIG. 24A is a conceptual view illustrating the case that a light spot of the three laser beams which are incident on the reflecting plane of the rotating mirror is projected on a plane S' which is conjugate with the recording sheet.
Figure 24B:
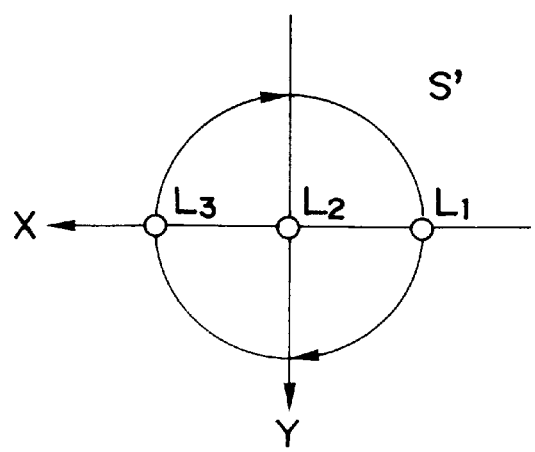
FIG. 24B is a plan view showing a locus of the light spot of each laser beam on the plane S'.

Accordingly, as exemplified in FIG. 23C, the incident direction of the laser beam L0 on the rotating mirror 32 is displaced in the directions of X-axis and Y-axis (in the drawing, it is displaced by $\theta_{XY}$ in the directions of X-axis and Y-axis) In such a manner, the irradiation position of the laser beam can be two-dimensionally displaced. As shown in FIG. 24A, the light spots of the laser beams $L_1$, $L_2$ and $L_3$, which are incident on the reflecting surface of the rotating mirror 32, are projected on a surface S' which is conjugate with the recording sheet S. In this case, when the angular velocity of the rotating mirror 32 is defined as ω, the loci of the light spots of the laser beams $L_1$ and $L_3$ on the surface S' with the rotation of the rotating mirror 32 are formed by circles which are represented by the following equations (1) and (2) (see FIG. 24B).

The laser beam $L_1$: $x=-a\cdot\cos\omega t$, $Y=-a\cdot\sin\omega t$ (1)

The laser beam $L_3$: $x=a\cdot\cos\omega t$, $Y=a\cdot\sin\omega t$ (2)

Thus, the laser beam $L_1$ is deflected by the first and second AODs 18X and 18Y of the light deflector 18 in accordance with the above equation (1) in the corresponding directions to the directions of X-axis and Y-axis. The laser beam $L_3$ is deflected by the first and second AODs 22X and 22Y of the light deflector 22 in accordance with the above equation (2) in the corresponding directions to the directions of X-axis and Y-axis. The laser beams $L_1$ and $L_3$ emitted from the rotating mirror 32 can be spaced at a constant interval along the direction of Z-axis (the direction of M on the recording sheet S) at all times. As shown in FIG. 22C, the three scanning lines formed by the laser beams $L_1$, $L_2$ and $L_3$ can be parallel to one another, and the end positions thereof can line up.

On the basis of the above description, the embodiment is provided with the controller 38 shown in FIG. 25. As shown in FIG. 25, the controller 38 is connected to the transducer of each AOD. The controller 38 comprises the control circuit 40. The control circuit 40 is connected to the rotary encoder (not shown) which is mounted to the motor 34. The control circuit 40 generates the clock signal in accordance with the rotating position signal P synchronized to the rotation of the motor inputted from the rotary encoder and the main scanning start signal LSYNC.

The control circuit 40 is connected to a cosine-wave voltage signal generating circuit 42, a sine-wave voltage signal generating circuit 44, a constant voltage signal generating circuit 46, a cosine-wave voltage signal generating circuit 48 and a sine-wave voltage signal generating circuit 50. The cosine-wave voltage signal generating circuit 42 generates the cosine-wave voltage signal represented by $X=-a\cdot\cos\omega t$ (where, a denotes the constant, ω denotes the angular velocity of the motor 34 (rotating mirror 32) represented by the clock signal, and t denotes the elapsed time) in accordance with the clock signal inputted from the control circuit 40. The sine-wave voltage signal generating circuit 44 generates the sine-wave voltage signal represented by $Y=-a\cdot\sin\omega t$ in accordance with the clock signal inputted from the control circuit 40.

The constant voltage signal generating circuit 46 generates the constant voltage signal. The cosine-wave voltage signal generating circuit 48 generates the cosine-wave voltage signal represented by $X=a\cdot\cos\omega t$ in accordance with the clock signal inputted from the control circuit 40. The sine-wave voltage signal generating circuit 50 generates the sine-wave voltage signal generated by $Y=a\cdot\sin\omega t$ in accordance with the clock signal inputted from the control circuit 40.

The voltage signal generating circuits 42, 44, 46, 48 and 50 are connected to voltage control oscillators (VCO) 52A, 52B, 52C, 52D and 52E which output the high frequency signal having the frequency in response to a voltage level of the input signal. Accordingly, the high frequency signal which is frequency modulated in response to the cosine-wave voltage signal of $X=-a\cdot\cos\omega t$ is outputted from the VCO 52A. The high frequency signal which is frequency-modulated in response to the sine-wave voltage signal of $Y=-a\cdot\sin\omega t$ is outputted from the VCO 52B. The high frequency signal which is frequency-modulated in response to the cosine-wave voltage signal of $X=a\cdot\cos\omega t$ is outputted from the VCO 52D. The high frequency signal which is frequency-modulated in response to the sine-wave voltage signal of $Y=a\cdot\sin\omega t$ is outputted from the VCO 52E. The high frequency signal having the constant frequency is outputted from the VCO 52C.

An output terminal of the VCO 52A is connected to the transducer of the first AOD 18x of the light deflector 18 through an amplifier 56A. The output terminal of the VCO 52D is connected to the transducer of the first AOD 22x of the light deflector 22 through an amplifier 56D. The signals outputted from the VCOs 52A and 52D are amplified by the amplifiers 56A and 56D. The amplified signals are inputted to the transducers of the first AODs 18x and 22x.

The output terminal of the VCO 52B is connected to the transducer of the second AOD 18y of the light deflector 18 through a modulator 54A and an amplifier 56B. The output terminal of the VCO 52C is connected to the transducer of the AOD 20 through a modulator 54B and an amplifier 56C. The output terminal of the VCO 52E is connected to the transducer of the second AOD 22y of the light deflector 22 through a modulator 54C and an amplifier 56E. The control circuit 40 is connected to a binary image signal generating circuit 58. The output of the binary image signal generating circuit 58 is connected to each of the modulators 54A, 54B and 54C.

The binary image signal generating circuit 58 outputs the binary image signal to the modulators 54A, 54B and 54C at the timing which is synchronized to the clock signal inputted from the control circuit 40. The VCOs 52B, 52C and 52E output the high frequency signals. Each high frequency signal is On/Off modulated in the modulators 54A, 54B and 54C in response to the binary image signal inputted from the binary image signal generating circuit 58. Each high frequency signal is amplified by the amplifiers 56B, 56C and 56E. Each signal is inputted to each transducer of the second AOD 18y, the AOD 20 and the second AOD 22y.

Next, the operation of the image recording apparatus will be described. The laser beam L generated from the laser beam generator 14 is split into the laser beams $L_1$, $L_2$ and $L_3$ by the beam splitter 16. The laser beam $L_2$ emitted from the beam splitter 16 is incident on the AOD 20. The high frequency signal having the constant frequency which is On/Off modulated in response to the binary image signal is inputted to the transducer of the AOD 20. Therefore, the incident laser beam $L_2$ on the AOD 20 is not deflected (diffracted) in the corresponding directions to the x-axis and y-axis, but is solely On/Off modulated in response to the binary image signal. The laser beam $L_2$ is emitted from the AOD 20. The laser beam $L_2$ is reflected by the mirror 26. The laser beam $L_2$ is incident on the rotating mirror 32 through the focusing lens 30.

The laser beam $L_1$ emitted form the beam splitter 16 is incident on the first AOD 18x of the light deflector 18. The high frequency signal which is frequency-modulated in response to the cosine-wave voltage signal of X=−a·cosωt is inputted to the transducer of the first AOD 18x. Therefore, the incident laser beam $L_1$ on the first AOD 18x is deflected (diffracted) in the corresponding direction to the x-axis. The amount of deflection is changed at any time in response to X=−a·cosωt. The laser beam $L_1$ is emitted from the first AOD 18x. The laser beam $L_1$ is incident on the second AOD 18y of the light deflector 18.

The high frequency signal which is frequency-modulated in response to the sine-wave voltage signal of Y=−a·sinωt and is On/Off modulated in response to the binary image signal is inputted to the transducer of the second AOD 18y. Accordingly, the incident laser beam $L_1$ on the second AOD 18y is deflected in the corresponding direction to the y-axis. The amount of deflection is changed at any time in response to Y=−a·sinωt. The laser beam $L_1$ is further On/Off modulated in response to the binary image signal. The laser beam $L_1$ is emitted from the second AOD 18y. The laser beam $L_1$ emitted from the second AOD 18y is reflected by the mirror 24. The laser beam $L_1$ is incident on the rotating mirror 32 through the focusing lens 30.

Furthermore, the laser beam $L_3$ emitted from the beam splitter 16 is incident on the first AOD 22x of the light reflector 22. The high frequency signal which is frequency-modulated in response to the cosine-wave voltage signal of X=a·cosωt is inputted to the transducer of the first AOD 22x. Therefore, the incident laser beam $L_3$ on the first AOD 22x is deflected (diffracted) in the corresponding direction to the x-axis. The amount of deflection is changed at any time in response to X=a·cosωt. The laser beam $L_3$ is emitted from the first AOD 22x. The laser beam $L_3$ is incident on the second AOD 22y of the light deflector 22.

The high frequency signal which is frequency-modulated in response to the sine-wave voltage signal of Y=a·sinωt and is On/Off modulated in response to the binary image signal is inputted to the transducer of the second AOD 22y. Accordingly, the incident laser beam $L_3$ on the second AOD 22y is deflected in the corresponding direction to the y-axis. The amount of deflection is changed at any time in response to Y=a·sinωt. The laser beam $L_3$ is further On/Off modulated in response to the binary image signal. The laser beam $L_3$ is emitted from the second AOD 22y. The laser beam $L_3$ emitted from the second AOD 22y is reflected by the mirror 28. The laser beam $L_3$ is incident on the rotating mirror 32 through the focusing lens 30.

The rotating mirror 32 is rotated around the z-axis. The three incident laser beams $L_1$, $L_2$ and $L_3$ on the rotating mirror 32 are reflected by the reflecting surface of the rotating mirror 32. Accordingly the laser beams $L_1$, $L_2$ and $L_3$ are scanned on the recording sheet S. The laser beam $L_1$ is deflected by the light deflector 18 in accordance with the equation (1) in the corresponding directions to the x-axis and y-axis. The laser beam $L_3$ is deflected by the light deflector 22 in accordance with the equation (2) in the corresponding directions to the x-axis and y-axis. Accordingly, as shown in FIG. 22C, the three scanning lines which are formed on the recording sheet S by the laser beams $L_1$, $L_2$ and $L_3$ are parallel to one another, the end positions thereof line up together. Accordingly, it is possible to record the image with a high accuracy on the recording sheet S in which the recording range is the same in the main scanning direction of each scanning line that constitutes the image and the distortion is not formed.

In the embodiment, as described above, each attitude of the first AOD 18x and the second AOD 18y of the light deflector 18 and the first AOD 22x and the second AOD 22y of the light deflector 22 is adjusted so as to the following conditions. The Bragg angle $\theta_B$ is defined as $\theta_B \doteq 4°$. The rotating angle $Oz_1$ around the axis in the direction of propagation of the incident light on the first AOD is defined as $\theta_{Z1} \doteq +80°$. The warping angle $\theta_{A1}$ of the first AOD is defined as $\theta_{A1} \doteq +10°$. The rotating angle $\theta_{Z2}$ around the axis in the direction of propagation of the incident light on the second AOD is defined as $\theta_{Z2} \doteq -10°$. The warping angle $\theta_{A'2}$ of the second AOD is defined as $\theta_{A'2} \doteq +10°$. Accordingly, the total diffraction efficiency of the first and second AODs is much higher than the conventional diffraction efficiency. An energy of the laser beam emitted from the laser beam generator 14 is effectively used, and the image can be recorded.

As described above, each attitude of the first AOD 18x and the second AOD 18y of the light deflector 18 and the first AOD 22x and the second AOD 22y of the light deflector 22 is adjusted so as to the following conditions. The Bragg angle $\theta_B$ is defined as $\theta_B \doteq 4°$. The rotating angle $\theta_{Z1}$ around the axis in the direction of propagation of the incident light on the first AOD is defined as $\theta_{Z1} \doteq +80°$. The warping angle $\theta_{A1}$ of the first AOD is defined as $\theta_{A1} \doteq +10°$. The rotating angle $\theta_{Z2}$ around the axis in the direction of propagation of the incident light on the second AOD is defined as $\theta_{Z2} \doteq -$ 10°. The warping angle $\theta_{A'2}$ of the second AOD is defined as $\theta_{A'2} \doteq +10°$. That is, the case is exemplified in which each attitude is adjusted so that the deflecting directions of the first and second AODs may be perpendicular to each other. However, in order to two-dimensionally deflect the incident light, the deflecting directions of the first and second AODs may at least cross each other. For example, the attitudes of the first and second AODs may be adjusted so as to the conditions described below. That is, the Bragg angle $\theta_B$ is defined as $\theta_B \doteq 4°$. The rotating angle $\theta_{Z1}$ around the axis in the direction of propagation of the incident light on the first AOD is defined as $\theta_{Z1} \doteq +70°$. The warping angle $\theta_{A1}$ of the first AOD is defined as $\theta_{A1} \doteq +10°$. The rotating angle $\theta_{Z2}$ around the axis in the direction of propagation of the incident light on the second AOD is defined as $\theta_{Z2} \doteq -5°$. The warping angle $\theta_{A'2}$ of the second AOD is defined as $\theta_{A'2} \doteq +10°$. Thus, each diffraction efficiency of the first and second AODs is generally maximum. The total diffraction efficiency of the first and second AODs can be generally maximum.

However, in this case, at least one of the deflecting direction of the first AOD and the deflecting direction of the second AOD is shifted from the corresponding direction to the direction of X-axis or Y-axis in the XYZ coordinate system which is set for the laser beam to be incident on the rotating mirror 32. Therefore, the first and second AODs are driven in the same manner that the deflecting directions of the first and second AODs are perpendicular to each other. In this case, when the light spots of the incident laser beams $L_1$, $L_2$ and $L_3$ on the reflecting surface of the rotating mirror 32 are projected on the surface S' which is conjugate with the recording sheet S (see FIG. 24A), the loci of the light spots of the laser beams $L_1$ and $L_3$ on the surface S' are not round circle represented by the equations (1) and (2), but ellipse. Such a problem occurs.

The phase and amplitude for the frequency modulation of the high frequency signal to be inputted to the transducers of the first and second AODs are changed (the phase and amplitude of the cosine-wave voltage signal or the sine-wave voltage signal inputting VCO 52 are changed). The amount of deflection of the laser beam of the first and second AODs is changed. The loci of the light spots of the laser beams $L_1$ and $L_3$ can be the round circle represented by the equations (1) and (2).

Hereinafter, when the deflecting directions of the first and second AODs are not perpendicular to each other, the amount of deflection of the first and second AODs is obtained so that the locus of the light spot may be the round circle.

Figure 26:
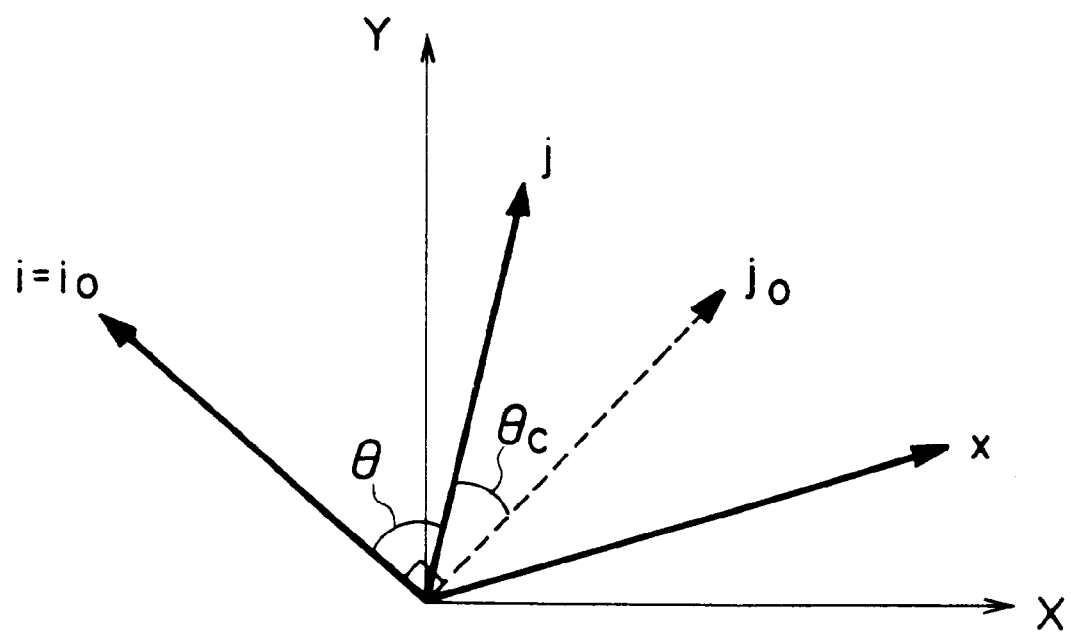
FIG. 26 is a conceptual view for illustrating a process which obtains the conditions so that the locus of the light spot of the laser beam may be round when the deflecting directions of the first and second AODs are not perpendicular to each other.

As exemplified in FIG. 26, when the deflecting directions of the first and second AODs are perpendicular to each other, each deflecting direction of each AOD is represented by unit vectors $i_0$, $j_0$. When the deflecting directions of the first and second AODs are not perpendicular to each other (the crossing angle is defined as $\theta$ at this time), each deflecting direction of each AOD is represented by unit vectors $i$, $j$. When a vector x at an arbitrary position is represented by the perpendicular unit vectors $i_0$, $j_0$ and the non-perpendicular unit vectors $i$, $j$, it is represented by the following equations $$x = a_0 \cdot i_0 + b_0 \cdot j_0 \qquad (3)$$

$$x = a \cdot i + b \cdot j \qquad (4)$$

where a relationship between coefficients $a_0$, $b_0$ and a, b is represented by the following equations.

$$a = a_0 - \cot\theta \cdot b_0 \qquad (5)$$

$$b = \frac{1}{\sin\theta} \cdot b_0 \qquad (6)$$

Next, when the vector x is defined as the position of the light spot of the laser beam, the conditions are obtained so that the locus of the light spot (the locus of the vector x) may be the round circle. When the unit vectors $i_0$, $j_0$ are used so as to represent the locus of the light spot (round circle) the coefficients $a_0$, $b_0$ in the equation (3) represent a function of time. The locus is represented by the following equations:

$$a_0(t) = \cos(\omega + \phi) \qquad (7)$$

$$b_0(t) = \sin(\omega + \phi) \qquad (8)$$

where $\phi$ denotes a phase at t=0, when the value t is defined as t=0 (when the position of the light spot coincides with the vector $i_0$, t=0), $\phi=0$. In the equations (7) and (8), the light spot turns along the direction from the unit vector $i_0$ to the unit vector $j_0$ (a clockwise direction in FIG. 26). Next, the equations (7) and (8) are substituted into the equations (5) and (6). The unit vectors i, j are used so as to represent the locus (round circle). At this time, when the coefficients a, b in the equation (4), they are represented by the following equations:

$$a(t) = \frac{1}{\cos(\tan^{-1}(\cot(\theta)))} \cdot \cos(\omega t + \phi + \tan^{-1}(\cot\theta)) \qquad (9)$$

$$b(t) = \frac{1}{\sin\theta} \cdot \sin(\omega t + \phi) \qquad (10)$$

where, when a non-perpendicular angle $\theta_c$ is defined so as to be $\theta_c = \pi/2 - \theta$, $\cot\theta = \tan\theta_c$. Thus, the equations (9) and (10) are represented by the following equations.

$$a(t) = \frac{1}{\cos\theta_c} \cdot \cos(\omega t + \phi + \theta_c) \qquad (11)$$

$$b(t) = \frac{1}{\cos\theta_c} \cdot \sin(\omega t + \phi) \qquad (12)$$

Accordingly, even if the deflecting directions of the first and second AODs are not perpendicular to each other ($\theta \neq 90°$), the amount of deflection of the first AOD and the amount of deflection of the second AOD are changed as represented by the equations (11) and (12). That is, compared to the case that the deflecting directions of the first and second AODs are perpendicular to each other, each amount of deflection of the first and second AODs is ($1/\cos\theta_c$) times amount. The phase and amplitude for the frequency modulation of the high frequency signal to be inputted to the first and second AODs are changed so that the phase of the amount of deflection of one AOD may be shifted $\theta_c$ from that of the other AOD. In such a manner, the locus of the light spot of the laser beam can be the round circle.

Although the example is described above in which the $TeO_2$ single crystal is used as the acousto-optic medium, the uniaxial crystal and the biaxial crystal of $PbMoO_4$ or the like can be used in the present invention.

Although the image recording apparatus is exemplarily described above as the light beam scanning apparatus according to the present invention, the present invention is not limited to this. The present invention can be applied to other light beam scanning apparatus such as an image reading apparatus which causes the light beam to scan an irradiated object and detects a light volume of the light beam which is reflected from the irradiated object or which the irradiated object transmits so as to read the image recorded on the irradiated object.

As described above, the first acousto-optic deflecting element is arranged so that the optical axis of the acousto-optic crystal of the first acousto-optic deflecting element may not be parallel to the plane including the direction of propagation of the incident light on the first acousto-optic deflecting element and the direction of propagation of the ultrasonic wave in the acousto-optic crystal of the first acousto-optic deflecting element. The second acousto-optic deflecting element is arranged so that the deflecting direction of the second acousto-optic deflecting element may cross that of first acousto-optic deflecting element, the optical axis of the acousto-optic crystal of the second acousto-optic deflecting element may not be parallel to the plane including the direction of propagation of the incident light on the second acousto-optic deflecting element and the direction of propagation of the ultrasonic wave in the acousto-optic crystal of the second acousto-optic deflecting element. Accordingly, the incident light can be two-dimensionally deflected with the high diffraction efficiency over the wide frequency band. The low-cost light deflector can be obtained.

The above-described light deflector is used so as to obtain the low-cost light beam scanning apparatus and image recording apparatus in which the diffraction efficiency is improved.

What is claimed is:

1. An acousto-optic element using an anisotropic Bragg diffraction generated between an ultrasonic wave propagating in an anisotropic crystal and a light wave propagating in the anisotropic crystal, wherein said acousto-optic element is arranged in such a manner that an optical axis of the anisotropic crystal is not parallel to a plane including a direction of propagation of an incident light and a direction of propagation of the ultrasonic wave.

2. The acousto-optic element according to claim 1, wherein said anisotropic crystal is a uniaxial crystal.

3. The acousto-optic element according to claim 1, wherein said anisotropic crystal is formed of $TeO_2$.

4. The acousto-optic element according to claim 1, wherein said acousto-optic element is an acousto-optic deflecting element.

5. A light beam scanning apparatus comprising the acousto-optic element of claim 1.

6. An acousto-optic element using an anisotropic Bragg diffraction generated between an ultrasonic wave propagating in an anisotropic crystal and a light wave propagating in the anisotropic crystal, wherein said acousto-optic element is arranged so as to satisfy one of the following conditions:

a first condition that an optical axis of the anisotropic crystal is not parallel to a plane including a direction of propagation of an incident light and a direction of propagation of the ultrasonic wave, and a plane of polarization of the incident light is parallel to the plane including the direction of propagation of the incident light and the direction of propagation of the ultrasonic wave, and a second condition that the optical axis of the anisotropic crystal is not parallel to the plane including the direction of propagation of the incident light and the direction of propagation of the ultrasonic wave, and the plane of polarization of the incident light is not parallel to the plane including the direction of propagation of the incident light and the direction of propagation of the ultrasonic wave.

7. An acousto-optic element, in which an xyz coordinate system is determined such that a direction of propagation of an incident light is a z-axis and a polarization direction of the incident light is an x-axis, an initial state is defined such that the direction of the ultrasonic wave propagating in the anisotropic crystal is parallel to the x-axis and the optical axis of the anisotropic crystal coincides with the z-axis, and said acousto-optic element is rotated from the initial state by a predetermined angle around an axis perpendicular to a plane including the z-axis and the direction of propagation of the ultrasonic wave, and said acousto-optic element uses the anisotropic Bragg diffraction generated between the ultrasonic wave propagating in the anisotropic crystal and the light wave propagating in the anisotropic crystal, wherein said acousto-optic element is further rotated around the axis in the same direction as the direction of propagation of the ultrasonic wave.

8. The acousto-optic element according to claim 7, wherein an angle of rotation around the axis in the same direction as the direction of propagation of the ultrasonic wave is substantially 3° or more.

9. The acousto-optic element according to claim 7, wherein said acousto-optic element is also rotated around the z-axis.

10. The acousto-optic element according to claim 9, wherein the predetermined angle around the axis perpendicular to the plane including the z-axis and the direction of propagation of the ultrasonic wave is defined as a Bragg angle, the angle of rotation around the axis in the same direction as the direction of propagation of the ultrasonic wave is substantially 3° or more, and an angle of rotation around the z-axis is from substantially 30° to substantially 90°.

11. An image recording apparatus comprising:

a laser beam generator for generating a plurality of laser beams;

a scanning apparatus disposed on an optical path of each laser beam, said scanning apparatus having a plurality of acousto-optic elements of claim 1 for changing the direction of the laser beams and a reflecting plane tilted with respect to a central axis of a cylinder, said reflecting plane being rotated around the central axis of the cylinder, thereby scanning the laser beams along an inner plane of the cylinder;

an optical system for causing a plurality of laser beams deflected by said acousto-optic elements to be incident on said reflecting plane; and a controller for generating an ultrasonic wave so that the scanning lines of the respective laser beams formed along the inner plane of the cylinder are made parallel to each other and the scanning lengths of the respective laser beams are made equal to each other within the range of the same scanning angle of said scanning apparatus, and for propagating the generated ultrasonic wave in said acousto-optic elements.

12. A light deflector comprising first and second acousto-optic deflecting elements using anisotropic Bragg diffraction generated between an ultrasonic wave propagating in an anisotropic crystal and a light wave propagating in the anisotropic crystal, the light deflected by said first acousto-optic deflecting element being incident on said second acousto-optic deflecting element, wherein said first acousto-optic deflecting element is arranged such that the optical axis of an anisotropic crystal of said first acousto-optic deflecting element is not parallel to a plane including a direction of propagation of incident light which is incident on said first acousto-optic deflecting element and a direction of propagation of an ultrasonic wave in the anisotropic crystal of said first acousto-optic deflecting element, and said second acousto-optic deflecting element is arranged such that a deflecting direction of said second acousto-optic deflecting element intersects a deflecting direction of said first acousto-optic deflecting element, and the optical axis of an anisotropic crystal of said second acousto-optic deflecting element is not parallel to a plane including a direction of propagation of incident light which is incident on said second acousto-optic deflecting element and a direction of propagation of an ultrasonic wave in the anisotropic crystal of said second acousto-optic deflecting element.

13. The light deflector according to claim 12, wherein said first and second acousto-optic deflecting elements are arranged such that the deflecting direction of said first acousto-optic deflecting element is perpendicular to the deflecting direction of said second acousto-optic deflecting element.

14. The light deflector according to claim 12, wherein said anisotropic crystal is a uniaxial crystal.

15. The light deflector according to claim 12, wherein said anisotropic crystal is formed of $TeO_2$.

16. The light deflector according to claim 12, wherein both said first and second acousto-optic deflecting elements are mounted in a single package.

17. A light beam scanning apparatus comprising the light deflector of claim 12.

18. A light deflector comprising first and second acousto-optic deflecting elements using anisotropic Bragg diffraction generated between an ultrasonic wave propagating in an anisotropic crystal and a light wave propagating in the anisotropic crystal, the light deflected by said first acousto-optic deflecting element being incident on said second acousto-optic deflecting element, wherein said first acousto-optic deflecting element is arranged so as to satisfy one of the following conditions:

a first condition that the optical axis of an anisotropic crystal of said first acousto-optic deflecting element is not parallel to a plane including a direction of propagation of the incident light which is incident on said first acousto-optic deflecting element and a direction of propagation of an ultrasonic wave in the anisotropic crystal of said first acousto-optic deflecting element, and the plane of polarization of the incident light is parallel to the plane including the direction of propagation of the incident light and the direction of propagation of the ultrasonic wave, and a second condition that the optical axis of the anisotropic crystal of said first acousto-optic deflecting element is not parallel to plane including the direction of propagation of the incident light and the direction of propagation of the ultrasonic wave, and the plane of polarization of the incident light is not parallel to the plane including the direction of propagation of the incident light and the direction of propagation of the ultrasonic wave; and said second acousto-optic deflecting element is arranged so as to satisfy one of the following conditions:

a first condition that the deflecting direction of said second acousto-optic deflecting element intersects the deflecting direction of said first acousto-optic deflecting element, the optical axis of an anisotropic crystal of said second acousto-optic deflecting element is not parallel to a plane including a direction of propagation of incident light which is incident on said second acousto-optic deflecting element and a direction of propagation of an ultrasonic wave in the anisotropic crystal of said second acousto-optic deflecting element, and the plane of polarization of the incident light is parallel to the plane including the direction of propagation of the incident light and the direction of propagation of the ultrasonic wave, and a second condition that the deflecting direction of said second acousto-optic deflecting element intersects the deflecting direction of said first acousto-optic deflecting element, the optical axis of the anisotropic crystal of said second acousto-optic deflecting element is not parallel to the plane including the direction of propagation of the incident light and the direction of propagation of the ultrasonic wave, and the plane of polarization of the incident light is not parallel to the plane including the direction of propagation of the incident light and the direction of propagation of the ultrasonic wave.

19. A light deflector comprising first and second acousto-optic deflecting elements using anisotropic Bragg diffraction generated between an ultrasonic wave propagating in an anisotropic crystal and a light wave propagating in the anisotropic crystal, the light deflected by said first acousto-optic deflecting element being incident on said second acousto-optic deflecting element, wherein, said first acousto-optic deflecting element is arranged such that, when an xyz coordinate system is determined such that a direction of propagation of incident light which is incident on said first acousto-optic deflecting element is defined as a z-axis and the polarization direction of the incident light is defined as an x-axis, an initial state of said first acousto-optic deflecting element is defined such that a direction of propagation of an ultrasonic wave in an anisotropic crystal of said first acousto-optic deflecting element is parallel to the x-axis and the optical axis of the anisotropic crystal of said first acousto-optic deflecting element coincides with the z-axis, from the initial state, said first acousto-optic deflecting element is rotated around an axis in the same direction as the direction of propagation of the ultrasonic wave and is rotated by a predetermined angle around an axis perpendicular to a plane including the z-axis and the direction of propagation of the ultrasonic wave, and said second acousto-optic deflecting element is arranged such that the deflecting direction of said second acousto-optic deflecting element intersects the deflecting direction of said first acousto-optic deflecting element, and when an x'y'z' coordinate system is determined such that a direction of propagation of incident light which is incident on said second acousto-optic deflecting element is defined as a z'-axis and the polarizing direction of the incident light is defined as an x'-axis, and an initial state of said second acousto-optic deflecting element is defined such that a direction of propagation of an ultrasonic wave in an anisotropic crystal of said second acousto-optic deflecting element is parallel to the x'-axis and the optical axis of the anisotropic crystal of said second acousto-optic deflecting element coincides with the z'-axis, from the initial state, said second acousto-optic deflecting element is rotated around an axis in the same direction as the direction of propagation of the ultrasonic wave and is rotated by a predetermined angle around an axis perpendicular to a plane including the z'-axis and the direction of propagation of the ultrasonic wave.

20. The light deflector according to claim 19, wherein said first acousto-optic deflecting element is such that an angle of rotation around the axis in the same direction as the direction-of propagation of the ultrasonic wave in the anisotropic crystal of said first acousto-optic deflecting element is substantially 3° or more, and said second acousto-optic deflecting element is such that an angle of rotation around the axis in the same direction as the direction of propagation of the ultrasonic wave in the anisotropic crystal of the second acousto-optic deflecting element is substantially 3° or more.

21. The light deflector according to claim 19, wherein said first acousto-optic deflecting element is also rotated around said z-axis, and said second acousto-optic deflecting element is also rotated around said z'-axis.

22. The light deflector according to claim 21, wherein for said first acousto-optic deflecting element, an angle of rotation around the axis perpendicular to the plane including the z-axis and the direction of propagation of the ultrasonic wave in the anisotropic crystal in said first acousto-optic deflecting element is defined as a Bragg angle, an angle of rotation around the axis in the same direction as the direction of propagation of the ultrasonic wave is substantially 3° or more, and an angle of rotation around the z-axis is from substantially 30° to substantially 90°, and for said second acousto-optic deflecting element, an angle of rotation around the axis perpendicular to the plane including the z'-axis and the direction of propagation of the ultrasonic wave in the anisotropic crystal in said second acousto-optic deflecting element is defined as a Bragg angle, an angle of rotation around the axis in the same direction as the direction of propagation of the ultrasonic wave is substantially 3° or more, and an angle of rotation around the z'-axis is from substantially 30° to substantially 90°.

23. The light deflector according to claim 22, wherein the angle of rotation of said first acousto-optic deflecting element around the z-axis is from substantially 70° to substantially 75°, and the angle of rotation of the second acousto-optic deflecting element around the z'-axis is from substantially 70° to substantially 75°.

24. An image recording apparatus comprising:

a laser beam generator for generating a plurality of laser beams;

scanning apparatus disposed on an optical path of each laser beam, said scanning apparatus having a plurality of acousto-optic elements of claim 12 for changing the direction of the laser beams and a reflecting plane tilted with respect to a central axis of a cylinder, said reflecting plane being rotated around the central axis of the cylinder, thereby scanning the laser beams along an inner plane of the cylinder;

an optical system for causing a plurality of laser beams deflected by said acousto-optic elements to be incident on said reflecting plane; and a controller for generating an ultrasonic wave so that the scanning lines of the respective laser beams formed along the inner plane of the cylinder are made parallel to each other and the scanning lengths of the respective laser beams are made equal to each other within the range of the same scanning angle of said scanning apparatus, and for propagating the generated ultrasonic wave in said acousto-optic elements.

* * * * *